(12) United States Patent
Schwartz et al.

(10) Patent No.: US 6,185,214 B1
(45) Date of Patent: Feb. 6, 2001

(54) USE OF CODE VECTORS FOR FRAME FORWARDING IN A BRIDGE/ROUTER

(75) Inventors: Leonard Schwartz, Bedford; John A. Flanders, Ashland; William D. Townsend, Groton; David C. Ready, Westwood, all of MA (US)

(73) Assignee: 3Com Corporation, Santa Clara, CA (US)

( * ) Notice: Under 35 U.S.C. 154(b), the term of this patent shall be extended for 0 days.

(21) Appl. No.: 08/927,915

(22) Filed: Sep. 11, 1997

(51) Int. Cl.[7] .................................................. H04L 12/28
(52) U.S. Cl. ............................................ 370/401; 370/389
(58) Field of Search .................................... 370/401, 402, 370/428, 412, 389, 400, 410, 241, 252

(56) References Cited

U.S. PATENT DOCUMENTS

| | | | |
|---|---|---|---|
| 5,825,774 | 10/1998 | Ready et al. ........................... | 370/401 |
| 5,831,971 | * 11/1998 | Bonomi et al. ....................... | 370/230 |
| 6,016,310 | * 1/2000 | Muller et al. ......................... | 370/255 |
| 6,018,526 | * 1/2000 | Liu et al. .............................. | 370/401 |

* cited by examiner

Primary Examiner—Huy D. Vu
Assistant Examiner—Dung Trinh
(74) Attorney, Agent, or Firm—Weingarten, Schurgin, Gagnebin & Hayes LLP

(57) ABSTRACT

A Receive Frame Processor (RFP) in a network bridge/router for receiving frame-characterizing information from other elements of the bridge/router and for generating plural code vectors which result in the selective processing of a received frame in software and/or hardware is provided. The received information is utilized in constructing code vectors representative of how a received frame is to be processed. Further data structures stored in conjunction with the RFP are indexed by the constructed code vectors and indicate whether the frame is to be processed in the RFP hardware, by software in an associated Frame Processor, or both. These data structures also indicate whether the port through which the frame was received is to be blocked to prevent misordering of received frames. If the frame is to be processed in software, the RFP generates a Receive Vector which is provided to the FP and which conveys the frame-characterizing code vectors to the FP. If the frame is to be processed in hardware by the RFP, a Transmit Vector is generated which contains information such as a mask of which transmit ports are to be utilized for forwarding the received frame, and information necessary for reconstructing a header for the received frame, including which encapsulation format is to be utilized for the frame.

21 Claims, 32 Drawing Sheets

| Name | Bits | Description |
|---|---|---|
| MAC DA | Bits 0 - 31<br>Bits 0 - 15 | Original MAC DA. For unicast routed frames, the original MAC DA is overwritten by the new MAC DA. The RFP must save original MAC DA in the control area of the first segment for roving RMON cases. |
| MAC SA | Bits 16 - 31<br>Bits 0 - 31 | The MAC SA is used by the RFP (along with MAC DA) to calculate MAC DA/SA pair hash index (2 byte CRC) for RMON applications. |
| RCF | Bit 3 | Route Cache Flag Bit. This bit is set when the RHP determines a routing case (as opposed to bridging). This flag is used as an indicator of ACA bridge or route cache used. |
| Protocol Index | Bits 4 - 7 | RHP obtained protocol index. The protocol index is stored in Protocol and LLC Tables. |
| Receive Port | Bits 8 - 15 | Virtual port on which the frame is received. |
| VLAN ID | Bits 16 - 23 | VLAN ID from the VLAN Mapping table. |
| CoS ID | Bits 8 - 15 | CoS ID calculated by the RHP. Either taken from the frame (802.1q tag), or PACE mapped into CoS, or null CoS value. |
| Sequence Number | Bits 0 - 7 | Frame sequence number. Used for synchronization between the RHP, RFP and the ASA. |
| RCV DL Encapsulation | Bits 27 - 31 | Inbound Data Link Encapsulation as determined by the RHP. |
| RHP Data | Bits 0 - 7<br>Bits 16 - 31 | Protocol dependent data. For IP v.4, the TTL value is placed in the RHP Data field. For IP v.4 IP datagram length is placed in the last word. |
| RHP Status Word | Bits 8 - 15 | The RHP Status Word defines results of RHP microcode processing. The RHP stores bit encoded information that is to be used by the RFP in forwarding a frame (see Figure 5). |
| RHP Exception Status | Bits 16 - 31 | The RHP Exception Status defines results of RHP microcode processing. The RHP stores encoded exception information in this field. The RFP does not handle the frame forwarding when this field is set by the RHP and the frame is passed to the FP. The field is different for bridging and routing (see Figure 6). |
| PDD VLAN Tag | Bits 0 - 31 | PDD VLAN tag is passed to the RFP here. |

*FIG. 8*

ACA to RFP data

| Bridged Frame | |
| --- | --- |
| Unicast | Multicast |
| Protocol ID | Protocol ID |
| Frame control | Frame control |
| DA VC handle | DA VC handle |
| | |
| SA search status | SA search status |
| SA address state | SA address state |
| DA search status | DA search status |
| DA address state | DA address state |
| | |
| Unused | Unused |
| Unused | Unused |
| | |
| Unused | Unused |
| RHP vlan ID | RHP vlan ID |
| Unused | Unused |
| | |
| Transmit virtual port | Transmit virtual port |
| LBPG mask | LBPG mask |
| | |
| DA adr group mask (31-24) | Reserved |
| DA adr group mask (23-0) | DA vport mask |
| | |
| DA adr group mask (31-0) | DA adr group mask (31-0) |
| | |
| DA learned port | Puma multicast mask |
| Discard bit, TX encap | Reserved |
| Receive virtual port | Receive virtual port |
| Sequence number | Sequence number |
| | |
| SA software tag | SA software tag |
| DA software tag | DA software tag |
| | |
| Unused (12 bits) | Unused (12 bits) |

*FIG. 9A*

ACA to RFP data

| Routed Frame | |
|---|---|
| Unicast | Multicast |
| Protocol ID | Protocol ID |
| Frame control | Frame control |
| DA VC handle | DA VC handle |
| | |
| SA search status | SA search status |
| SA address state | SA address state |
| DA search status | DA search status |
| DA address state | DA address state |
| | |
| DA(47-24) | Parent port mask |
| DA(23-16) | Forward port mask(23-16) |
| | |
| DA(15-0) | Forward port mask(15-0) |
| RHP vlan ID | RHP vlan ID |
| ACA vlan ID | ACA vlan ID |
| | |
| Transmit virtual port | Transmit virtual port |
| LBPG mask | LBPG mask |
| | |
| QOS(39-32) | QOS(39-32) |
| QOS(31-8) | QOS(31-8) |
| | |
| DA adr group mask (31-0) | DA adr group mask (31-0) |
| | |
| DA learned port | Puma multicast mask |
| Discard bit, TX encap | Reserved |
| QOS(7-0) | QOS(7-0) |
| Sequence number | Sequence number |
| | |
| SA software tag | SA software tag |
| DA software tag | DA software tag |
| | |
| | |
| Unused (12 bits) | Unused (12 bits) |

*FIG. 9B*

| Bit Position | Field Description |
|---|---|
| 0 | Address Hit Bit. When this bits is set the ACA found an address in its address cache. For DA when the bit is reset, the frame must be processed by the FP software in order to a) handle unknown destination address frame; b) install destination address into ACA cache. For SA when the bit is reset, the frame must be processed by the FP software in order to a) learn unknown SA; b) install destination address into the ACA cache. |
| 1 | Port Group Equal Bit. Same as Port Equal Bit but applies to a group of ports as oppose to a single port. This is used when LAN Trunking is configured. |
| 2 | Port Bit Equal. This bit is set when the frame is received on the same port as configured in the ACA for this address. For MAC SA this is used for detecting MAC address movements. For DA in bridge case it is used to implement local bridge filtering function. For DA in route case, it is used to detect ICMP redirect cases. |
| 3 | Incomplete Search Bit. This bit is set when the ACA did not have enough time to search for address in it's cache. When this bit is set, the frame must be processed by the FP software. |
| 4 | Software Override Bit. When this bit is set, the frame must be passed to the FP. No hardware forwarding of this frame is performed. Not used by the RFP. |
| 5 | Reserved |
| 6 | Broadcast bit. Not used by the RFP. |
| 7 | Multicast bit. Not used by the RFP. |

*FIG. 9C*

| Bit Position | Field Description |
|---|---|
| 0 | ACA Multicast entry indicator. Not used by RFP. |
| 1 | CRC required bit. Provided to support LLC based encapsulation for bridged traffic on ATM interfaces. Currently not used, and provided for future expansion. |
| 2 | Transmit Loss Flag. This bit effects frame loss ratio. |
| 3-4 | Transmit Queue Priority. This selects one of the possible 4 transmit priority queues. This bit effects frame transfer delay. |
| 5 | Internal Address Flag. When this bit is set, the frame must be passed to the FP software for further processing. |
| 6-7 | ACA Entry Notification Indication. Generates 1 of 3 possible monitoring vectors. Type 1 and 3 do not have buffer. Type 2 also contains buffer. |

*FIG. 9D*

| Bit Position | Field Description |
|---|---|
| 0 | QoS enable. Indicates if the entry contains valid QoS information. |
| 1 | RSVP flow. When set, indicates a RSVP flow. |
| 2-3 | Excess action. Valid if QoS enable is set. |
| 4 | Excess monitor flag. When set, RFP generates type 1 monitor vector for excess frame. Valid if QoS enable is set. |
| 5 | Excess loss flag. This bit effects frame loss ratio. Valid if QoS enasble is set. |
| 6-7 | Excess Transmit Priority. This selects one of the possible 4 transmit priority queues. This bit effects frame transfer delay. Valid QoS enable is set. |

*FIG. 9E*

| Vector # | Code Group | Handled by | Block | Exception Type |
|---|---|---|---|---|
| 0 | System | RFP | No | Nop |
| 1 | System | FP | No | Receive status errors, statistics counted and frame is discarded by FP |
| 2 | System | RFP | NA | Resource error, Receive State Machine is out of segments and the partial frame is discarded |
| 3 | System | FP | No | Receive Non-LLC FDDI traffic (SMT, etc.) |
| 4 | System | FP | Yes | Possible IP fragmentation, FP handles fragmentation and forwarding or discard |
| 5 | System | FP | Yes | Inbound Custom Filters, FP handles CF and forwarding |
| 6 | System | FP | Yes | Outbound Custom Filters, FP handles CF and forwarding |
| 7 | System | FP | Yes | Inbound Protocol specific Custom Filters, FP handles CF and forwarding |
| 8 | System | FP | Yes | Outbound Protocol specific Custom Filters, FP handles CF and forwarding |
| 9 | System | FP | Yes | Inbound Multicast Custom Filters, FP handles CF and forwarding |
| 10 | System | FP | Yes | Outbound Multicast Custom Filters, FP handles CF and forwarding |
| 11 | System | RFP | NA | Inbound Protocol specific Custom Filters, RFP discards the frame |
| 12 | System | RFP | NA | Outbound Protocol specific Custom Filters, RFP discards the frame |
| 13 | System | RFP | NA | Inbound MAC address group filter, RFP discards the frame |
| 14 | System | RFP | NA | Outbound MAC address group filter, RFP discards the frame |
| 15 | System | RFP | NA | Inbound Port Group filter, RFP discards the frame |
| 16 | System | RFP | NA | Outbound Port Group filter, RFP discards the frame |
| 17 | System | RFP | NA | Inbound Combination Group filter, RFP discards the frame |
| 18 | System | RFP | NA | Outbound Combination Group filter, RFP discards the frame |
| 19 | System | FP | Yes | MAC SA is not in ACA address cache, port mismatch or incomplete search, bridge learning |
| 20 | System | RFP | NA | Same segment traffic, bridge local filtering, frame discarded by RFP |
| 21 | System | RFP | NA | Receive port disabled, frame discarded by RFP |
| 22 | System | RFP | NA | Transmit port disabled, frame discarded by RFP |
| 23 | System | RFP | NA | Receive port blocked, frame discarded by RFP |
| 24 | System | RFP | NA | Transmit port blocked, frame discarded by RFP |

*FIG. 10A*

| Vector # | Code Group | Handled by | Block | Exception Type |
|---|---|---|---|---|
| 25 | System | RFP | NA | Receive port not forwarding, frame discardedby RFP |
| 26 | System | RFP | NA | Transmit port not forwarding, frame discarded by RFP |
| 27 | System | RFP | NA | Multicast firewall rate is exceeded on receive, frame discarded by RFP |
| 28 | System | FP | No | Internal bridge cache address exception, frame processed FP |
| 29 | System | FP | Yes | Unknown receive VLAN, frame processed and forwarded by FP |
| 30 | System | RFP | NA | Receive VLAN security violation for unicast bridged frame, frame discarded by RFP |
| 31 | System | RFP | NA | Transmit VLAN security violation for unicast bridged frame, frame discarded by RFP |
| 32 | System | RFP | NA | QoS excess traffic discard, frame discarded by RFP |
| 33 | System | FP | No | Inbound software override, frame is handled by FP |
| 34 | System | FP | No | Outbound software override, frame is handled by FP |
| 35 | System | RFP | NA | Receive Flow Filter Vector, frame discarded by RFP |
| 36 | System | FP | Yes | Receive frame LLC PDU min length, frame forwarding is handled by FP |
| 37 | System | FP | Yes | Receive frame VLAN mis-configuration (PDD/PACE vs. IEEE802.1q), frame is handled by FP |
| 38 | System | FP | Yes | MAC DA is not in the bridge cache or flow lookup on bridge frame failed |
| 39 | System | FP | Yes | RHP exception for bridged or routed frame |
| 40 | System | FP | Yes | Internal route cache address exception, frame processed by FP |
| 41 | System | FP | Yes | Interanal flow cache address exception, frame processed by FP |
| 42 | System | RFP | NA | Our MAC DA address |
| 43 | System | FP | Yes | Multicast exception, frame processed by FP |
| 44 | System | FP | Yes | Encapsulated hardware transmit vector |
| 45 | System | FP | Yes | IP v4 unicast routed same segment traffic, frame forwarded by FP |
| 46 | System | FP | Yes | IP v4 unicast routed frame, destination address miss in the route cache |
| 47 | System | FP | Yes | IP v4 unicast routed frame, routing is disabled |
| 48 | System | FP | Yes | IP v4 multicast routed frame, destination address miss in the route cache |
| 49 | System | RFP | NA | IP v4 multicast routed frame, received not on parent port, frame is discarded |
| 50 | System | RFP | NA | IP v4 multicast routed frame discarded on transmit due to TTL transmit port setting |
| 51 | System | FP | Yes | IPX unicast routed frame, destination address miss in the route cache |
| 52 | System | FP | Yes | IPX unicast routed frame, routing is disabled |
| 53 | System | FP | Yes | Flow cache entry movement (i.e. different receive port) is detected |
| 54 | System | RFP | NA | Source Routed frame is received, frame discarded by the RFP |
| 63 | System | FP | Yes | RFP System Vector generation error - RFP failed to generate appropriate system vector |

*FIG. 10B*

| Vector # | Code Group | Handled by | Block | Exception Type |
|---|---|---|---|---|
| | | | | Auxiliary Bridge Vectors (0-31) |
| 0 | Auxiliary | RFP | NA | Nop |
| 1 | Auxiliary | RFP | NA | Unicast known Ethernet to Ethernet bridged frame, frame forwarded by RFP |
| 2 | Auxiliary | RFP | NA | Unicast known Ethernet to FDDI bridged frame, frame forwarded by RFP |
| 3 | Auxiliary | RFP | NA | Unicast known Ethernet to ATM bridged frame, frame forwarded by RFP |
| 4 | Auxiliary | RFP | NA | Unicast known FDDI to FDDI bridged frame, frame forwarded by RFP |
| 5 | Auxiliary | RFP | NA | Unicast known FDDI to Ethernet bridged frame, frame forwarded by RFP |
| 6 | Auxiliary | RFP | NA | Unicast known FDDI to ATM bridged frame, frame forwarded by RFP |
| 7 | Auxiliary | RFP | NA | Unicast known ATM to Ethernet bridged frame, frame forwarded by RFP |
| 8 | Auxiliary | RFP | NA | Unicast known ATM to FDDI bridged frame, frame forwarded by RFP |
| 9 | Auxiliary | RFP | NA | Unicast known ATM to ATM bridged frame, frame forwarded by RFP |
| 10 | Auxiliary | RFP | NA | Multicast known Ethernet bridged frame, frame forwarded by RFP |
| 11 | Auxiliary | RFP | NA | Multicast known FDDI bridged frame, frame forwarded by RFP |
| 12 | Auxiliary | RFP | NA | Multicast known ATM bridged frame, frame forwarded by RFP |
| 13 | Auxiliary | RFP | NA | Multicast unknown Ethernet bridged frame, frame forwarded by RFP |
| 14 | Auxiliary | RFP | NA | Multicast unknown FDDI bridged frame, frame forwarded by RFP |
| 15 | Auxiliary | RFP | NA | Multicast unknown ATM bridged frame, frame forwarded by RFP |
| | | | | |
| | | | | Auxiliary IP v4 Router Vectors (32-63) |
| 32 | Auxiliary | RFP | NA | IP v4 unicast routed Ethernet to Ethernet frame, frame forwarded by RFP |
| 33 | Auxiliary | RFP | NA | IP v4 unicast routed Ethernet to FDDI frame, frame forwarded by RFP |
| 34 | Auxiliary | RFP | NA | IP v4 unicast routed Ethernet to ATM frame, frame forwarded by RFP |
| 35 | Auxiliary | RFP | NA | IP v4 unicast routed FDDI to FDDI frame, frame forwarded by RFP |
| 36 | Auxiliary | RFP | NA | IP v4 unicast routed FDDI to Ethernet frame, frame forwarded by RFP |
| 37 | Auxiliary | RFP | NA | IP v4 unicast routed FDDI to ATM frame, frame forwarded by RFP |
| 38 | Auxiliary | RFP | NA | IP v4 multicast routed frame from Ethernet, frame forwarded by RFP |
| 39 | Auxiliary | RFP | NA | IP v4 multicast routed frame from FDDI, frame forwarded by RFP |
| | | | | |
| | | | | Auxiliary IPX Router Vectors (64-73) |
| 64 | Auxiliary | RFP | NA | IPX unicast routed Ethernet to Ethernet frame, frame forwarded by RFP |
| 65 | Auxiliary | RFP | NA | IPX unicast routed Ethernet to FDDI frame, frame forwarded by RFP |
| 66 | Auxiliary | RFP | NA | IPX unicast routed Ethernet to ATM frame, frame forwarded by RFP |
| 67 | Auxiliary | RFP | NA | IPX unicast routed FDDI to FDDI frame, frame forwarded by RFP |
| 68 | Auxiliary | RFP | NA | IPX unicast routed FDDI to Ethernet frame, frame forwarded by RFP |
| 69 | Auxiliary | RFP | NA | IPX unicast routed FDDI to ATM frame, frame forwarded by RFP |
| 70 | Auxiliary | RFP | NA | IPX multicast routed frame from Ethernet, frame forwarded by RFP |
| 71 | Auxiliary | RFP | NA | IPX multicast routed frame from FDDI, frame forwarded by RFP |
| | | | | |
| 126 | Auxiliary | FP | Yes | All routed frames not supported in hardware, FP forwards the frames |
| 127 | Auxiliary | FP | Yes | RFP Auxiliary Vector generation error - RFP failed to generate appropriate Auxiliary vector |

*FIG. 11*

| Vector # | Code Group | Handled by | Block | Exception Type |
|---|---|---|---|---|
| | | | | RMON Vectors (0-15) |
| 0 | RMON | RFP | NA | Nop |
| 1 | RMON | RFP | NA | External local receive port RMON analysis, frame forwarded by RFP |
| 2 | RMON | RFP | NA | External local transmit port RMON analysis, frame forwarded by RFP |
| 3 | RMON | RFP/FP | Yes | Internal local receive port RMON analysis, frame forwarded by RFP and processed by FP |
| 4 | RMON | RFP/FP | Yes | Internal local transmit port RMON analysis, frame forwarded by RFP and processed by FP |
| 5 | RMON | FP | No | External remote receive port RMON analysis, frame processed and forwarded by FP |
| 6 | RMON | FP | No | External remote transmit port RMON analysis, frame processed and forwarded by FP |
| 7 | RMON | RFP/FP | Yes | Internal sampling receive port RMON analysis, frame forwarded by RFP and processed by FP |
| 8 | RMON | FP | No | Internal Probe receive frame, frame processed by FP |
| 9 | RMON | RFP | NA | External Probe receive frame, frame discarded by RFP |
| 10 | RMON | RFP | NA | Remote RMON frame to external RMON Probe, frame forwarded by RFP |
| 15 | RMON | FP | Yes | RFP RMON Vector generation error - RFP failed to generate appropriate RMON vector |

*FIG. 12*

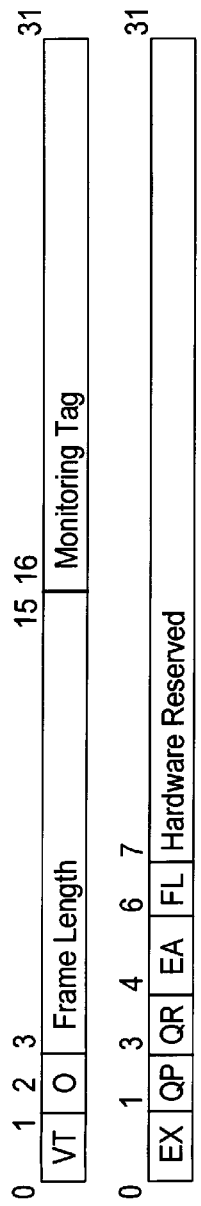
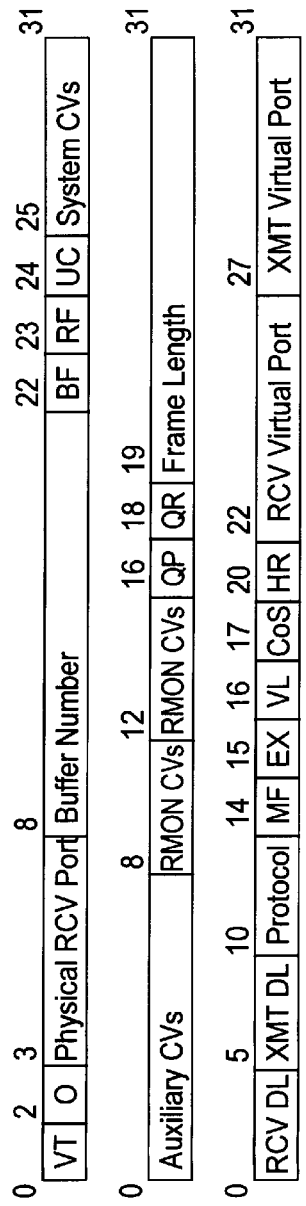
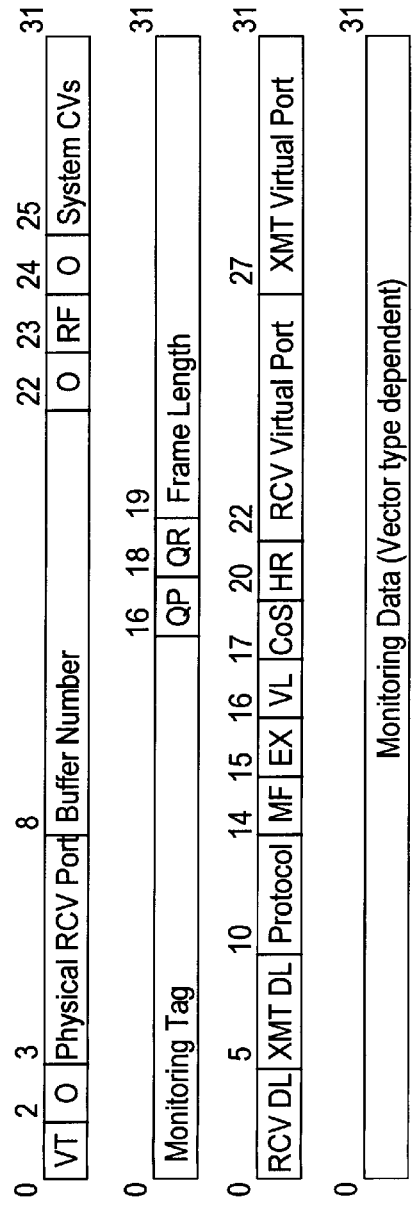
FIG. 14A
FIG. 14B
FIG. 14C

RFP VLAN Forwarding Table

| Indexed By | MSB | | | | | | | | output | | | | | | | | | LSB | |
|---|---|---|---|---|---|---|---|---|---|---|---|---|---|---|---|---|---|---|---|
| | 0 | | | | | | | | | | | | | | | | 47 | 48 | |
| VLAN ID | 0 | 1 | 2 | 3 | 4 | 5 | 6 | · | · | · | · | · | · | · | · | · | 23 | FP | |
| 0 | | | | | | | | | | | | | | | | | | | |
| 1 | | | | | | | | | | | | | | | | | | | |
| 2 | | | | | | | | | | | | | | | | | | | |
| 3 | | | | | | | | | | | | | | | | | | | |
| 4 | | | | | | | | | | | | | | | | | | | |
| 5 | | | | | | | | | | | | | | | | | | | |
| 6 | | | | | | | | | | | | | | | | | | | |
| 7 | | | | | | | | | | | | | | | | | | | |
| 8 | | | | | | | | | | | | | | | | | | | |
| 9 | | | | | | | | | | | | | | | | | | | |
| · | | | | | | | | | | | | | | | | | | | |
| · | | | | | | | | | | | | | | | | | | | |
| · | | | | | | | | | | | | | | | | | | | |
| 255 | | | | | | | | | | | | | | | | | | | |

← Port States (2 bits each) →

Port States
0 = Port Disabled
1 = Port Blocked
2 = Port Learning
3 = Port Forwarding FP - FP deliver bit 49 bits * 256 entries = 12544 bits

*FIG. 15*

| Value | Name | Description |
|---|---|---|
| 0x80 | Our MAC DA Bit | This bit is set when unicast MAC DA is in the RHP MAC Address table. |
| 0x40 | IP v4 Multicast MAC DA Bit | This bit is set when the MAC destination address is IP v4 multicast. |
| 0x20 | TCP/IP Bit | This bit is set when the frame is TCP/IP. |
| 0x10 | Flow Frame Bit | This bit is set when the frame must be looked up by the flow information. Valid only for unicast and multicast bridged or routed frames. |
| 0x08 | Overlap VLAN Bit | Set when the source VLAN is a logical union of overlapped IP VLANs (from VLAN Mapping Table). |
| 0x04 | VLAN Tag Bit | Set when IEEE VLAN tag is present in the frame. |
| 0x02 | CoS Tag Bit | Set when IEEE CoS tag is present in the frame. |
| 0x01 | Reserved Bit | |

RHP Status Word

FIG. 16

| Bits | Bridging | IP v4 Routing | IP v6 Routing | IPX Routing | AT Routing |
|---|---|---|---|---|---|
| 16 | Exception Bit (1) | Exception Bit (1) | Exception Bit (1) | Exception Bit (1) | Exception Bit (1) |
| 17 | VLAN Search | VLAN Search | | | |
| 18 | Source Routing | IP Header Options | | | |
| 19 | Non LLC Frame | IP Header Errors | | | |
| 20 | Reserved | IP Checksum Error | | | |
| 21 | Reserved | IP Version Error | | | |
| 22 | Reserved | IP TTL Error | | | |
| 23 | Reserved | IP SA Error | | | |
| 24-31 | Reserved | Reserved | | | |

RHP Exception Status

NOTES:
(1) Exception Bit. This bit is set when the RHP microcode detected that the frame cannot be handled entirely in hardware. The frame must be passed to the FP. The reason for exception is protocol specific and it is encoded in the following bits of the RHP Exception Word.

FIG. 17

| 0 | 6 | 9 | 12 | 13 | 14 | 15 | 16 | 17 | 18 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|
| HR | PT | RMON | SRO | STO | TF | RF | TMF | RMF | STP | AGR | AGP | PGR | PGT | CGR | CGT | IP4 | IPm | IP6 | IPX | AT | MF |

Port Control Table Entry

FIG. 18

HR    Bits 0 - 5    Hardware Reserved

PT    Bits 6 - 8    Defines network port type. The following network port types defined:
                             000 - Port not present
                             001 - Ethernet (10BaseT or 100BaseT);
                             010 - FDDI;
                             011 - Gigabit Ethernet;
                             100 - ATM (OC-3);
                             101 - ATM (OC-12);
                             110 - Reserved;
                             111 - Reserved;

RMON    Bits 9 - 11    Port RMON Configuration. Defines Port RMON configuration options. All RMON Configuration options are mutually exclusive. When External Local or External Remote or Internal roving RMON analysis is enabled, the address of the RMON probe port is defined in the RMON Probe Table. The following are valid configuration options:
                               000 - No RMON configuration is enabled;
                               001 - External local roving RMON is enabled;

FIG. 19A

010 - External remote RNON is enabled;
011 - Internal RMON sampling is enabled;
100 - External RMON Probe is enabled;
101 - Internal RMON Probe is enabled;
110 - Internal roving RMON is enabled;
111 - Reserved;

External local roving RMON enabled. Indicates that this port is being monitored by the RMON Monitor Probe local to this switch. All frames received from and transmitted to this port are duplicated and sent to the Monitor Probe port. The Monitor Probe port is encoded in RMON Probe field.

External remote roving RMON enabled. Indicates that this port is being monitored by the RMON Monitor Probe remote to this switch. All frames received from and transmitted to this port are duplicated and sent to the Monitor Probe port. The Monitor Probe port is encoded in RMON Probe field.

Internal Monitor Enabled (RMON Sampling). When set, it forces every Nth frame to be passed to the internal RMON Probe on the FP fro RMON processing.

Internal roving RMON enabled. When set, every receive and transmit frame is also passed to the FP for internal RMON processing. In addition, the port of the same network type must be reserved and configured as Internal RMON Probe.

External RMON Probe enabled. Port is configured to be an RMON Probe port. No received frames are processed from this port. The only operation supported: transmission of duplicate frames received from or transmitted to the RMON monitor port.

Internal RMON Probe enabled. Port is configured to be used for internal RMON analysis. No frames are received from or transmitted to the port. The port is used to divert frames to be transmitted to the monitor port to the FP. The main idea here is to have transmitted frames passed to the FP to have their Data Link and Network Layer headers modified.

| | | |
|---|---|---|
| SRO | Bit 12 | Software Receive Override. When set every frame received from the port is to be forwarded to the FP software for further processing. Setting this bit disables all hardware based processing and forwarding of frames received on the port. This feature is used for VLAN multiplexing/de-multiplexing (e.g. inter-switch VLAN based encapsulation). |
| STO | Bit 13 | Software Transmit Override. When set every frame transmitted to the port is to be forwarded to the FP software for further processing. Setting this bit disables all hardware based processing and forwarding of frames to be transmitted on the port. This feature is used for VLAN multiplexing/de-multiplexing (e.g. inter-switch VLAN based encapsulation). |
| TF | Bit 14 | Transmit Path Custom Filters. Indicates that the management installed Custom Filters for all frames to be transmitted on this port. If set, all frames forwarded to this port must be passed to the FP to apply Custom Filters. |
| RF | Bit 15 | Receive Path Custom Filters. Indicates that the management installed Custom Filters for all frames received on this port. If set, all frames received from this port must be passed to the FP to apply Custom Filters. |

*FIG. 19B*

| | | |
|---|---|---|
| TMF | Bit 16 | Transmit Multicast Path Custom Filters. Indicates that the management installed Custom Filters for all multicast frames to be transmitted on this port. If set, all multicast frames forwarded to this port must be passed to the FP to apply Custom Filters |
| RMF | Bit 17 | Receive Multicast Path Custom Filters. Indicates that the management installed Custom Filters for all multicast frames received on this port. If set, all multicast frames forwarded to this port must be passed to the FP to apply Custom Filters. |
| STP | Bit 18-19 | Defines STP state of the port: disable, blocking, non-forwarding, forwarding |
| AGR | Bit 20 | Receive Path MAC Address Group. Enables/disables MAC address group enforcement for received frames. When set, it disallows received bridged traffic to be forwarded when source and destination MAC addresses are not in the same MAC address group. |
| AGT | Bit 21 | Transmit Path MAC Address Group. Enables/disables MAC address group enforcement for transmitted frames. When set, it disallows bridged traffic to be transmitted on a port, when source and destination MAC addresses are not in the same MAC address group. |
| PGR | Bit 22 | Receive Path Port Group. Enables/disables port group enforcement for received frames. When set, it disallows received bridge traffic to be forwarded when receive and transmit ports are not in the same port group(s): SRC-PG & DST-PG |
| PGT | Bit 23 | Transmit Path Port Group. Enables/disables port group enforcement for transmitted frames. When set, it disallows bridged traffic to be transmitted on a port, when receive and transmit ports are not in the same port group(s): SRC-PG & DST-PG |
| CGR | Bit 24 | Receive Path Combination Group. Enables/disables port group enforcement for received frames. When set, it disallows received bridged traffic to be forwarded when MAC source and destination addresses and the designation port are not in the same MAC address and port group(s): (SA-AG & DA-AG) & DST-PG |
| CGT | Bit 25 | Transmit Path Combination Group. Enables/disables port group enforcement for transmitted frames. When set, it disallows bridged traffic to be transmitted on a port, when MAC sources and destination addresses and the designation port are not in the same MAC address and port group(s): (SA-AG & DA-AG) & DST-PG |
| IP4 | Bit 26 | IP v4 Routing. When set, enables IP version 4 routing operations for a given port. |
| IP4M | Bit 27 | IP v4 Mullticast Routing. When set, enables IP version 4 multicast routing operations for a given port. When the bit is set, special bridging and routing processing is performed as defined in 3.6.2.1. When the bit is reset, frame with multicast MAC DA of IP v.4 multicast type is handled just like all other bridged cases with multicast MAC DA. |
| IP6 | Bit 28 | IP v6 Routing. When set, enables IP version 6 routing operations for a given port. |
| IPX | Bit 29 | IPX Routing. When set, enables IPX routing operations for a given port. |
| AT | Bit 30 | Appletalk Routing. When set, enables Appletalk routing operations for a given port. |
| MF | Bit 31 | Multicast Firewalls Limit. When set, enables multicast rate limit enforcement. Defines a maximum rate in frames per second at which received multicast traffic on this port is forwarded. Multicast traffic which exceeds this limit will be discarded. Maximum value can be set to 64K. |

*FIG. 19C*

| 0 | 1 | 2 | 3 | 4 | 5 | 6 | 7 | 8 | 9 | 11 | 19 | 31 |
|---|---|---|---|---|---|---|---|---|---|---|---|---|
| hr | cs | ec | lc | df | sq | mc | sc | fu | hr | Port number | Byte Count | |

Ethernet Transmit Frame Status

| | | |
|---|---|---|
| HR | Bit 0 | Hardware reserved |
| CS | Bit 1 | Carrier Sense Error |
| EC | Bit 2 | Excessive Collisions |
| LC | Bit 3 | Late Collisions |
| DF | Bit 4 | Deferred Frame Transmission |
| SQ | Bit 5 | SQE Test Errors |
| MC | Bit 6 | Multiple Collisions on Transmit |
| SC | Bit 7 | Single Collision on Transmit |
| FU | Bit 8 | Transmit FIFO Underrun |
| HR | Bits 9 - 10 | Hardware Reserved |
| TP | Bits 11 - 18 | Transmit Port Number |
| BC | Bits 19 - 32 | Transmit Byte Count |

*FIG. 20*

| | |
|---|---|
| VT | Transmit Vector Length. The following vector types are defined:<br>00 - Control Transmit Vector - 1 long word.<br>01 - Default Transmit Vector - 2 long words.<br>10 - Selective Transmit Vector - 3 long words.<br>11 - Multi Buffer Transmit Vector - 4 long words. |
| UB | Un-block Flag. When this flag is set, the receive port's queue will be un-blocked. |
| Receive Port | Defines physical port which is going to be un-blocked. The receive port must be setup when UB flag is set. |
| Buffer Number | Defines 14 bit first Segment number. |
| XMT Virtual Port | When the transmit port is ATM UNI, this field specifies virtual port number. |
| MX | Enables use of the extra 20 bytes of space at the beginning of the segment. Can be used only during the transmission. |
| PUMA Card Mask | Specifies transmit card bit mask. Used for Puma only. In Barracuda it must be set to zero. |
| SF | Start Frame Bit. When the bit is set, this is the first buffer in multi-buffer transmission. |
| EF | End Frame Bit. When the bit is set, this is the last buffer in multi-buffer transmission. |
| FS | First Segment Bit. When the bit is set, this is the special format first segment in multi-buffer transmission. See Buffer Management section. |
| Data Offset | Used as a byte offset to the data in the first segment of the frame. |
| Buffer Length | The total length of this buffer in bytes. |
| UseCount | This is to be added to the first segment's buffer UseCount. |
| NF | Not Free Bit. When the bit is set, the segments in the buffer are not released to the free list after the frame's transmission and the buffer use count remains unchanged. |
| SG | Start Group Bit. This is used only in multi-buffer transmissions and this bit is set when the first frame of the group is transmitted. This is used to guarantee that a group of frames (i.e. several IP frame fragments) either all going to be transmitted or all going to be discarded.<br>The following example defines the use of SG, EG, SF and EF bit usage: |

| SG | EG | SF | EF | Description |
|---|---|---|---|---|
| 1 | 0 | 1 | 0 | Start of first frame in the group |
| 0 | 0 | 0 | 0 | Part of first frame in the group |
| 0 | 0 | 0 | 1 | End of first frame in the group |
| 0 | 0 | 1 | 0 | Start of second frame in the group |
| 0 | 0 | 0 | 1 | End of second frame in the group |
| 0 | 1 | 1 | 1 | Start and end of third frame in the group, also end of the frame group |

*FIG. 22A*

| | |
|---|---|
| EG | End Group Bit. This is used only in multi-buffer transmissions and this bit is set when the last frame of the group is transmitted (see SG description). |
| QR | Queue Reserve Flag. When this flag is set, the queue threshold (which is set to be less than the queue size) is NOT to be used. The mechanism controls frame loss. |
| QP | Queue priority. Defines one of possible four transmit queues. Transmit queue 0 is the highest and transmit queue 3 is the lowest priority used. This mechanism controls frame transfer delay. |
| VL | IEEE 802.1q VLAN tag. When set, the frame contains 4 byte IEEE defined VLAN info. |
| CoS | IEEE 802.1q CoS tag. |
| RF | Router Flag Bit. When the bit is set, the frame is being routed as opposed to bridged. This is used by the THP to determine appropriate Translation Program. |
| Protocol | Protocol Index. Used by the THP to perform appropriate Network Layer changes. |
| RCV DL Encapsulation | For bridged frames (RF bit is zero) and routed frames (RF bit is one) this is the receive frame Data Link encapsulation type. |
| XMT DL Encapsulation | For bridged frames (RF bit is zero) this field is undefined. For unicast routed frames (RF bit is one) this is the actual transmit Data Link encapsulation type. |
| MC | Multicast Transmit Flag. This flag is set, when the frame is multicast destination, i.e. to be transmitted on 2 or more ports. |
| XMT Physical Port | For unicast transmission this is encoded transmit physical port number. For multicast transmission, this is a high order 5 bits of 24 bit transmit physical port bit mask. For unicast transmission (MC flag is reset) the port numbers:<br>0 - 23 Valid physical port<br>24 - 30 Invalid physical port, causes hardware interrupt;<br>31 - Special release port. When this port is used, the UseCount is decremented and if it reaches zero, the segments in the buffer are deallocated to the free list without actual transmission. |
| XMT Port Mask | This field exists only if MC flag is set, and it is a low order 19 bits of 24 bit transmit physical port bit mask. |
| UC | Use Count Plus 1 adjustment. When set, UseCount of the segment(s) in the Segment Descriptor(s) is incremented by 1. |

*FIG. 22B*

| | |
|---|---|
| VT | Vector Type, defines length of the Receive vector.<br>The following is used:<br>00 - vector length is 1 long word;<br>01 - vector length is 2 long words;<br>10 - vector length is 3 long words;<br>11 - vector length is 4 long words; |
| Physical RCV Port | 5 bit physical receive port. Used together with the buffer number to derive buffer address. |
| Buffer Number | 14 bit first segment identifier. Used together with the Physical RCV port to derive buffer address. |
| BF | Blocked Bit. If set, indicates that the receive queue has been blocked to preserve the frame ordering. The FP must un-block the queue to enable further frame forwarding by the hardware. |
| RF | Routing Flag Bit. The bit is set when the hardware detected that the frame is to be routed. When the bit is reset, the frame is to be bridged. |
| RPF | RMON Process Flag. When this flag is set, the frame must be processed by the internal RMON agent. |
| UC | Buffer Use Count adjustment flag. Valid only when BF flag is set. When set, FP increments buffer use count before port is unblocked. This allows simultanious support of hardware frame forwarding and software frame processing. |
| System CV | System based Code Vector. |
| Auxiliary CV | Additional bridge and routing protocol specific based Code Vector. |
| RCV RMON CV | RMON specific Code Vector. |
| XMT RMON CV | RMON specific Code Vector. |
| MF | Multicast Flag. When set, the hardware detected that the frame has to be transmitted on multiple ports. The hardware derived 24 bit physical port transmit bit mask and 8 bit Puma slot bit mask are saved in the buffer. |
| EX | Excess Traffic. Set when RFP qualifies the frame as a non-conforming, i.e. excess traffic. |
| EA | Excess Action. Valid only when EX is set in the vector. |
| FL | Flow Lookup. Set when lookup is done by flow ID. Valid only for Monitoring vector 1. for other vectors, the information is in RHP status word in the buffer. |
| VL | IEEE 802.1q VLAN tag. When set, the frame contains 4 byte IEEE defined VLAN info. |

*FIG. 23A*

| | |
|---|---|
| CoS | IEEE 802.1q CoS tag. |
| QP | Queue Priority. Defines one of possible 4 priority transmit queues. Transmit queue 0 is the highest and transmit queue 3 is the lowest priority. used. This mechanism controls frame transfer delay. |
| QR | Queue Reserve. When this flag is set, the queue threshold (which is set to be less than the queue size) is NOT to be used. |
| Frame Length | Defines received frame length in bytes with CRC. |
| RCV DL | Defines network media specific Data Link encapsulation of the frame as it was received. |
| XMT DL | Defines network media specific Data Link encapsulation of the frame as it is transmitted (as defined in the ACA entry). |
| Protocol | Protocol Index. Defines one of the possible 15 protocols programmed into the RFP. |
| HR | Hardware Reserved |
| Receive Virtual Port | Virtual port on which the frame was received. |
| Transmit Virtual Port | Virtual port on which the frame to be transmitted. This field is valid for only some of the System Code Vectors. |
| Monitoring Tag | Contains 16 bit value stored in the ACA cache (either bridge or route) entry. |
| Monitoring Data | Contains specific data for Special Monitoring Receive Vectors. |

*FIG. 23B*

1.  Protocol specific counters. The hardware maintains separate sets of counters per physical port, per protocol per receive direction. These counters are used to implement proprietary VLAN and RMON II protocol DistStatsTable MIB tables. Note that for overlapping subnets case, all unicast, multicast and broadcast frame and byte counters are maintained in software. The following counters are included here:
    a) number of unicast frames received;
    b) number of unicast bytes received;
    c) number of multicast frames received;
    d) number of multicast bytes received;
    e) number of broadcast frames received;
    f) number of broadcast bytes received;

Note that for each X3C ASIC there are 16 sets of these counters since the X3C ASIC is capable of recognizing up to 15 protocols and 1 default one. The following defines a total number of protocol specific counters maintained by the RFP:

unicast receive counters = 2*16(protocols)*3(rcv_ports) = 96;
    multicast receive counters = 2*16(protocols)*3(rcv_ports) = 96;
    broadcast receive counters = 2*16(protocols)*3(rcv_ports) = 96;

total counters = 288;
    total RAM required = 1152 bytes;

FIG. 24A

2.  Bridge specific counters. The hardware maintains a seperate sets of bridge counters per physical port. The following counters are included here:
    a) number of unicast bridge frames received;
    b) number of unicast bridge bytes received;
    c) number of non-unicast bridge frames received;
    d) number of non-unicast bridge bytes received;

The following defines a total number of bridge specific counters maintained by the RFP in the X3C ASIC:

unicast bridge receive counters = 2*3(rcv_ports) = 6;
    non-unicast bridge receive counters = 2*3(rcv_ports) = 6;

total counters = 12;
    total RAM required = 48 bytes;

FIG. 24B

3.     IP v4 router specfic counters. The hardware maintains a seperate sets of IP v4 router counters per physical port. The following counters are included here:
   - a)     number of unicast IP v4 router frames received;
   - b)     number of unicast IP v4 router bytes received;
   - c)     number of non-unicast IP v4 router frames received;
   - d)     number of non-unicast IP v4 router bytes received;

The following defines a total number of IP v4 router specific counters maintained by the RFP in the X3C ASIC:

unicast IP v4 router receive counters = 2*3(rcv_ports) = 6;
   non-unicast IP v4 router receive counters = 2*3(rcv_ports) = 6;

total counters = 12;
   total RAM required = 48 bytes;

FIG. 24C

4.     IPX router specific counters. The hardware maintains a separate sets of IPX router counters per physical port. The following counters are included here:
   - a)     number of unicast IPX router frames received;
   - b)     number of unicast IPX router bytes received;

The following defines a total number of IPX router specific counters maintained by the RFP in the X3C ASIC:

unicast IPX router receive counters = 2*3(rcv_ports) = 6;

total counters = 6;
   total RAM required = 24 bytes;

FIG. 24D

5. Discard frame statistics. The hardware will maintain counters for frames and octets discarded by the hardware in the "fast path". These counters are 4 bytes for octet for frame counters and maintained per port. These discard counters include the following cases:

a) number of multicast limit exceeded counter (rcv path);
  b) number of multicast limit exceeded frame discard counter (rcv path);
  c) number of "same segment" discard frames (transparent bridging) (rcv path);
  d) number of receive port non-forwarding frame discards (STP state) (rcv path);
  e) number of transmit port non-forwarding frame discards (STP state). This counter is used only for unicast frames. (xmt path);
  f) number of receive frames discarded due to buffer congestion (rcv path);
  g) number of transmit IP v4 routed multicast frames discarded due to configuration, i.e. TTL (xmt path);
  h) number of bytes for all received frames discarded by the hardware including frames discarded due to MAC errors and RFP applied filters on receive path. (rcv path);
  i) number of bytes for all transmited frames discarded by the hardware including frames discarded due to MAC errors and RFP applied filters on transmit path. Note that this byte counter may not be exact since RFP has only frame receive length (as oppose to frame transmit length after the possible Data Link headers translation) (xmt path);
  j) number of receive frames discarded due to VLAN security violation. This counter is used only for unicast bridged frames (rcv path);
  k) number of receive frames discarded due to QoS configuration, i.e. excess traffic (rcv path);
  l) number of IP v4 received frames discarded due to parent/forward mask configuration (rcv path);
  m) number of receive frames discarded due to receive path hardware configured filters (rcv path);
  n) number of transmit frames discarded due to transmit path hardware configured filters (xmt path);

receive discard counters = 7*3(rcv_ports) = 21;
transmit discard counters = 3*24(xmt_ports) = 72;

total counters = 93;
total RAM required = 372 bytes;

*FIG. 24E*

6. RMON 1 specific statistics. The hardware will maintain counters per port in the "fast path". These counters are 4 bytes each and they are used to count frame size distribution on the LAN, i.e. number of received frames that fall within certain frame size range. It includes the following:

a) number of frames between 17 and 64 bytes received;
   b) number of frames between 65 and 127 bytes received;
   c) number of frames between 128 and 255 bytes received;
   d) number of frames between 256 and 511 bytes received;
   e) number of frames between 512 and 1023 bytes received;
   f) number of frames between 1024 and 2047 bytes received;
   g) number of frames between 2048 and 4095 bytes received;
   h) number of frames between 4096 and 4500 bytes received;
   i) number of frames greater than 4500 bytes received;

receive frame counters = 8*3(rcv_ports) = 24;
   total RAM required = 96 bytes;

*FIG. 24F*

USE OF CODE VECTORS FOR FRAME FORWARDING IN A BRIDGE/ROUTER

RELATED APPLICATIONS

Not Applicable.

STATEMENT REGARDING FEDERALLY SPONSORED RESEARCH

Not Applicable.

BACKGROUND OF THE INVENTION

Layer-2 and layer-3 switches processed network traffic in software. Such processing, referred to herein as frame forwarding, includes but is not limited to classification of frames into bridged and routed classes, identification of frame protocol type, destination address lookup, identification of outgoing port(s), application of various filter conditions, application of input and output port states, Data Link layer translation/substitution, network layer modifications, etc. This invention introduces a new methodology, referred to herein as Code Vectors, which enable layer-2 and layer-3 switches to perform network traffic forwarding entirely in hardware, entirely in software, or in a combination in both hardware and software.

SUMMARY OF THE INVENTION

The present invention provides a Receive Frame Processor (RFP) as part of a network bridge/router for receiving frame-characterizing information from other elements of the bridge/router and for generating plural code vectors which result in the selective processing of a received frame in software and/or hardware. These other elements include circuits and state machines which: parse the received frames for source and destination address information and for protocol identification; analyze the received frame for reception errors; generate indices into various frame characterizing tables based upon the header of the received frame; convert the received destination and source addresses in preparation for transmission from the bridge/router; and register data associated with ports through which frames are received, the registered data characterizing the handling of received frames. The received information is utilized in constructing code vectors representative of how a received frame is to be processed. Plural code vectors may be applicable to a single received frame, though prioritization is utilized in determining which code vectors are ultimately employed.

Further data structures stored in conjunction with the RFP are indexed by the constructed code vectors and indicate: 1) whether the frame, as characterized by the code vectors, is to be processed in the RFP (i.e. in hardware), in software in an associated Frame Processor (FP), or both; and 2) if processed in the Frame Processor, whether the port through which the frame was received is to be blocked to prevent misordering of received frames.

If the frame is to be processed in software, the RFP generates a Receive Vector which is provided to the FP and which conveys the frame-characterizing code vectors to the FP. The FP, using the code vectors as pointers to the appropriate frame processing software, coordinates the further processing and forwarding of the received frame in software based upon the data in the Receive Vector. This includes the case where the frame is to be forwarded through the network bridge/router by the RFP and a copy of the frame is to be processed by the FP for monitoring purposes.

If the frame is to be processed by the RFP, a Transmit Vector is generated which contains information such as a mask which identifies transmit ports to be utilized for forwarding the received frame, and information necessary for translating a header for the received frame, in the event a different encapsulation format is to be utilized for frame transmission.

BRIEF DESCRIPTION OF THE DRAWINGS

The invention will be more fully understood by reference to the following Detailed Description of the Invention in conjunction with the drawings of which:

FIG. 8 further defines the RHP to RFP interface of FIG. 7;

FIGS. 9A and 9B illustrate Address Cache ASIC (ACA) to RFP interfaces;

FIG. 9C defines an ACA to RFP search status word;

FIG. 9D defines an ACA to RFP entry state word;

FIG. 9E defines an ACA to RFP Quality of Service (QoS) state word;

FIGS. 10A and 10B illustrate various System Code Vectors;

FIG. 11 illustrates various Auxiliary Code Vectors;

FIG. 12 illustrates various Remote Monitoring (RMON) Code Vectors;

FIG. 14A illustrates the format of an RFP Monitoring Vector;

FIG. 14B illustrates the format of an RFP Receive or Monitoring Vector;

FIG. 14C illustrates the format of a further RFP Monitoring Vector;

FIG. 15 illustrates a VLAN Table associated with the RFP;

FIG. 16 illustrates an RHP to RFP status word;

FIG. 17 illustrates an RHP to RFP exception status interface;

FIG. 18 illustrates the format of a Port Control Register (PCR);

FIGS. 19A, 19B and 19C define the entries of each PCR;

FIG. 20 illustrates an Ethernet Receive Frame Status word;

FIGS. 22A and 22B provide descriptions of the fields of the RFP to MBA Transmit Vector of FIG. 13;

FIGS. 23A and 23B provide descriptions of the fields of the RFP Receive and Monitor Vectors of FIGS. 14A, 14B and 14C; and FIGS. 24A through 24F provide statistics tables maintained by the RFP.

DETAILED DESCRIPTION OF THE INVENTION

Figure 1:
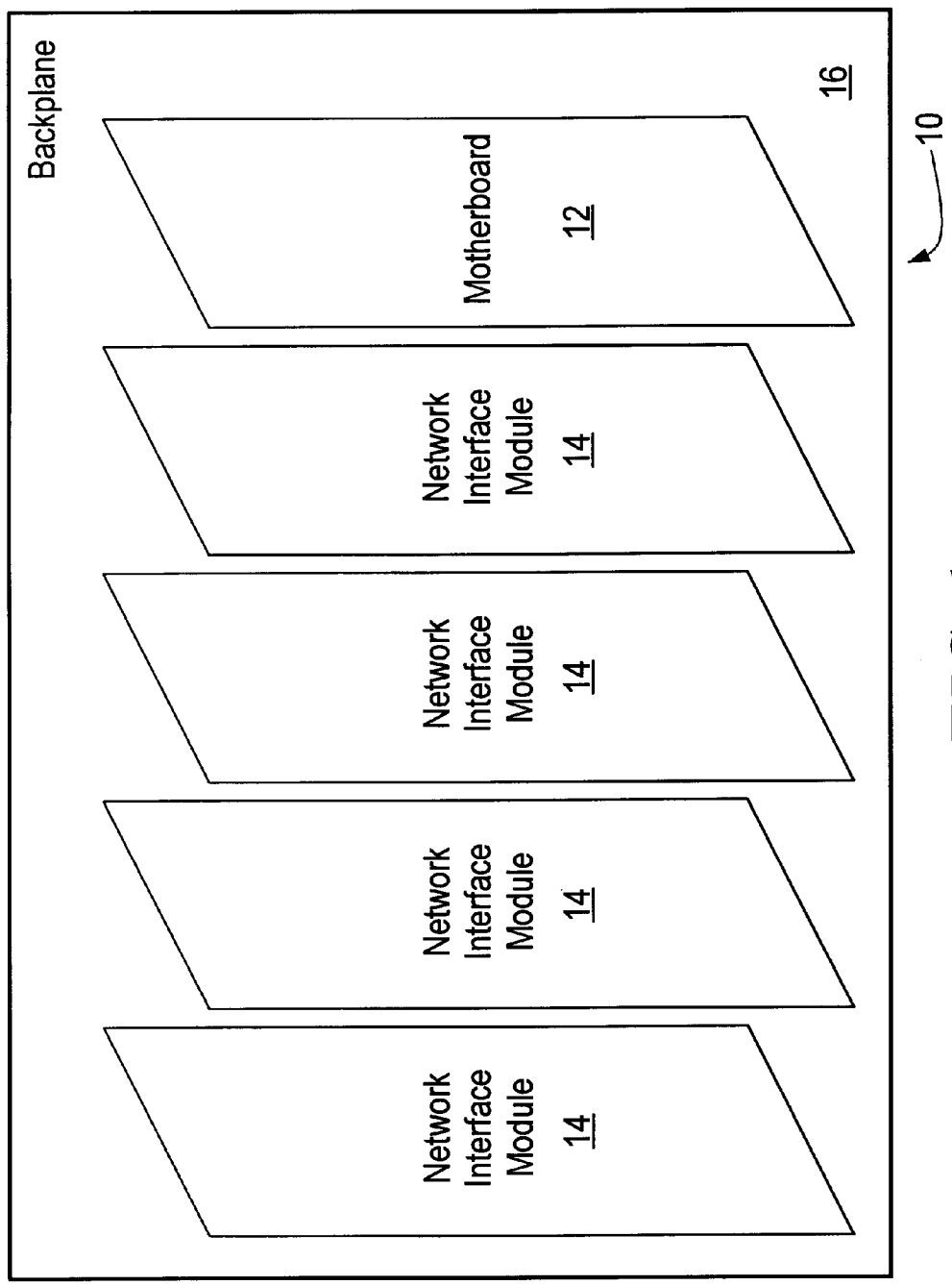
FIG. 1 is pictorial diagram of a network device in accordance with the present invention illustrating Network Interface Modules and a Motherboard mounted on a backplane.
Figure 2:
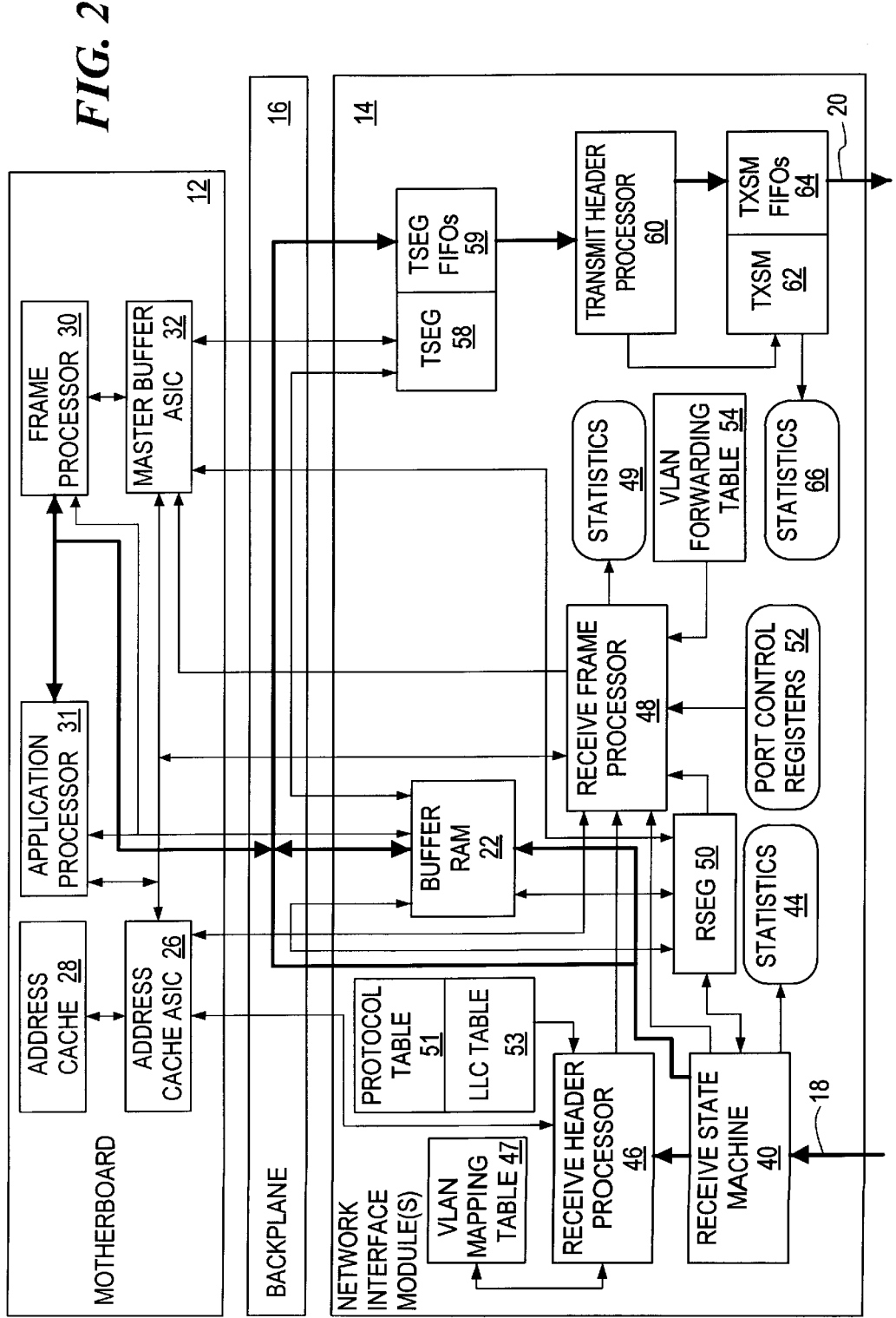
FIG. 2 is a block diagram of a network device in accordance with the present invention illustrating one Network Interface Module coupled to the Motherboard via a backplane.

Referring to FIG. 1 and 2, a bridge/router network device 10 for use in a telecommunications network includes a motherboard 12 and at least one network interface module 14. Each of the network interface modules 14 interfaces to the motherboard 12 through a backplane 16.

Each network interface module 14 includes at least one input port 18 through which data units such as frames, packets and cells are received and at least one output port 20 through which data units are forwarded downstream for receipt by another network device. In particular, the ports provide connections via communication links to other devices in the network. Incoming data units may be bridged, translationally bridged, routed, translationally routed or filtered.

In one embodiment of the presently disclosed network device 10, four slots are provided for network interface modules 14. Each slot may be populated with an Ethernet, FDDI or an ATM UNI interface module. In a preferred embodiment, each 10/100 megabit Ethernet network interface module 14 includes six input/output ports, each FDDI network interface module 14 includes six input/output ports, and each gigabit Ethernet network interface module 14 includes one input/output port. An ATM network interface module 14 includes two OC3 input/output ports or one OC12 input/output port.

Elements in the motherboard 12 and interface modules 14 are responsible for data unit reception and transmission, parsing of data link and network layer headers within received frames, look-up of source and destination Media Access Control ("MAC") and network layer addresses and for making forwarding decisions regarding the received frames.

The motherboard 12 includes an address cache ASIC ("ACA") 26 with an associated cache 28, a Frame Processor 30, an application processor 31 and a Master Buffer ASIC ("MBA") 32.

The ACA 26 serves to perform look-ups on destination and source addresses passed to the ACA from a Receive Header Processor ("RHP") within the respective network interface modules 14. The ACA 26 is capable of looking up MAC addresses for bridging support and Network Layer destination addresses for routing support.

The MBA 32 located on the motherboard 12 serves to provide global data buffer management of frames which reside in buffers in Buffer RAM 22 disposed on respective Network Interface Modules 14. Each network interface module 14 includes a receive ASIC and a transmit ASIC, both of which are specific to the type of data traffic supported by the respective network interface module (such as Ethernet, ATM and FDDI).

Each receive ASIC includes a Receive State Machine ("RSM" or "RXSM") 40, for receiving frames at respective ports 18 of the respective network interface module 14, a Receive Header Processor ("RHP") 46 for parsing headers of received frames, Buffer RAM 22 for storing received frames, a Receive Segment Processor (RSEG) 50 for dividing the received frame into segments and moving frame segments to appropriate locations within Buffer RAM 22, and a Receive Frame Processor ("RFP") 48 for making forwarding decisions regarding received frames.

The RHP 46 within the receive ASIC functions to parse the incoming data units to obtain the MAC source address, the MAC destination address and network layer addresses. Additionally, the RHP 46 determines the VLAN that the frame was received on, if any, and determines if the received data unit is a candidate for routing. If the received data unit is a candidate for routing, the RHP determines the protocol being used for the received data unit. Such information is forwarded to the ACA control logic 26 to generate an index into the ACA cache 28. The ACA cache 28 operates under the control of ACA control logic 26 to obtain forwarding information relative to the received data unit. Cache lookups are performed in the ACA cache 28 based upon indices generated within the ACA control logic 26.

More specifically each network interface module 14 includes a Receive State Machine ("RSM" or "RXSM") 40. Different versions of the RSM 40 are provided for the different network interface module 14 types, i.e. Ethernet, FDDI and ATM. The RSM 40 is responsible for receiving data units from the respective input ports 18 of the network interface module 14. After receiving a data unit, the RSM 40 generates data unit status information regarding received frames which is stored in registers 44 and forwarded to the RFP 48. The status information includes error information, receive byte counts and receive frame counts on a per port basis.

The RHP 46 is responsible for identifying data units to be bridged or routed, determining inbound data unit encapsulation type, determining the VLAN identification of the received frame and performing protocol specific processing for routed data units. Different versions of RHPs 46 are provided for different network interface types, i.e. Ethernet, FDDI and ATM. The RHP 46 is implemented primarily as a hardware microsequencer which is loaded with microcode by the frame processor 30. More specifically, the RHP 46 examines the layer 2 and layer 3 portions of the header of the received data unit to determine whether the data unit is to be bridged or routed. A protocol type table and LLC table are then employed to determine datagram type. For example, the header of the incoming ethernet data unit could be in any of a number of defined formats, for example DA/SA/Type, DA/SA/Length/LLC/OUI/Type, or DA/SA/Length/LLC. The RHP 48 determines data link encapsulation and protocol type by examining fields in the data link header immediately following the MAC DA and SA fields. For ethernet frames, inbound data link encapsulation can be either Ethernet version 2, SNAP or LLC encapsulated. For FDDI frames, inbound data link encapsulation can be either SNAP or LLC encapsulated. For Ethernet version 2 and SNAP encapsulated frames, the 2 byte LLC DSAP and SSAP is extracted from the LLC data link header. The two byte protocol type is used to search the RHP protocol table, whereas two byte LLC DSAP and SSAP fields are used to search the RHP LLC table. Based upon the results from the parsing of the layer 2 header a decision is made as to whether to employ a Type Table or an LLC table to identify a Protocol Identifier. The Protocol Identifier obtained from either the Type Table or the LLC table is employed as an index used to select a microcode processing routine for execution by the RFP and is also passed to the ACA control logic 26. Other header formats are applicable to other layer 2 protocols.

The RFP 48 is responsible for making forwarding decisions based on received data unit characterizing information supplied by the RHP 46, the ACA 26, Port Control Registers (PCRs) 52, the RSM 40, the Receive Segmentation Unit ("RSEG") 50 and configuration information contained in configuration tables used by the RFP 48. The RFP 48 is also responsible for maintaining certain statistics regarding the received data unit. A VLAN forwarding table 54 is employed by the RFP 48 to verify if the data unit is allowed to be forwarded through the designated transmit port. More specifically, RFP 48 processing results in the generation of Transmit Vectors for data units being forwarded via hardware, Receive Vectors for data units being passed to the FP 30 for further processing in software, and Monitor Vectors for forwarding a copy of the received data unit for further software analysis. In this manner two separate frame processing paths are defined, namely, a high speed hardware forwarding path and a lower speed software forwarding path. In all cases, the RFP increments the appropriate bridge, router, protocol VLAN, discard and RMON 1 statistics for all received frames. The Transmit and Receive Vectors specify the port(s) on which the frame is to be forwarded, outbound data link encapsulation type and other information needed for subsequent processing within the device 10. The RFP 48 is implemented primarily in hardware and is only partially programmable for error, monitoring and other special exception cases.

The RSEG 50 comprises a DMA controller which controls storage of received frame data within appropriate Buffer RAM 22 locations.

The transmit ASIC includes a Transmit Segment Unit (TSEG) 58, a plurality of Transmit Segment Unit (TSEG) FIFOs 59, a Transmit Header Processor (THP) 60, a Transmit State Machine ("TXSM") 62 and Transmit State Machine FIFOs 64. The TSEG 58 comprises a DMA controller which serves to move frame data segments from locations within the Buffer RAM 22 into an input FIFO designated as the TSEG FIFO 59, which comprises an input to the THP 60. The THP 60 performs necessary frame header translations and, upon completion of such translations, moves the translated header to an output FIFO designated as the Transmit State Machine (TXSM) FIFO 64. Frames are forwarded from the TXSM FIFO 64 over the respective output port 20 of the network interface module 14 for receipt by a downstream network device.

The TXSM 62 receives frames from the THP 60 and is responsible for transmitting data units from the device 10 out of the respective output port 20. Following transmission, the TXSM 62 generates data unit transmit status information in statistics registers 66. Such status information includes error information, transmit frame and byte count information on a per port basis. Different versions of the TXSM are provided for different network interface module 14 types, i.e. Ethernet, FDDI and ATM.

Receive Frame Processor (RFP)

The RFP 48 is responsible for making forwarding decisions regarding received frames based upon input from multiple elements of the bridge/router 10.

Figure 7:
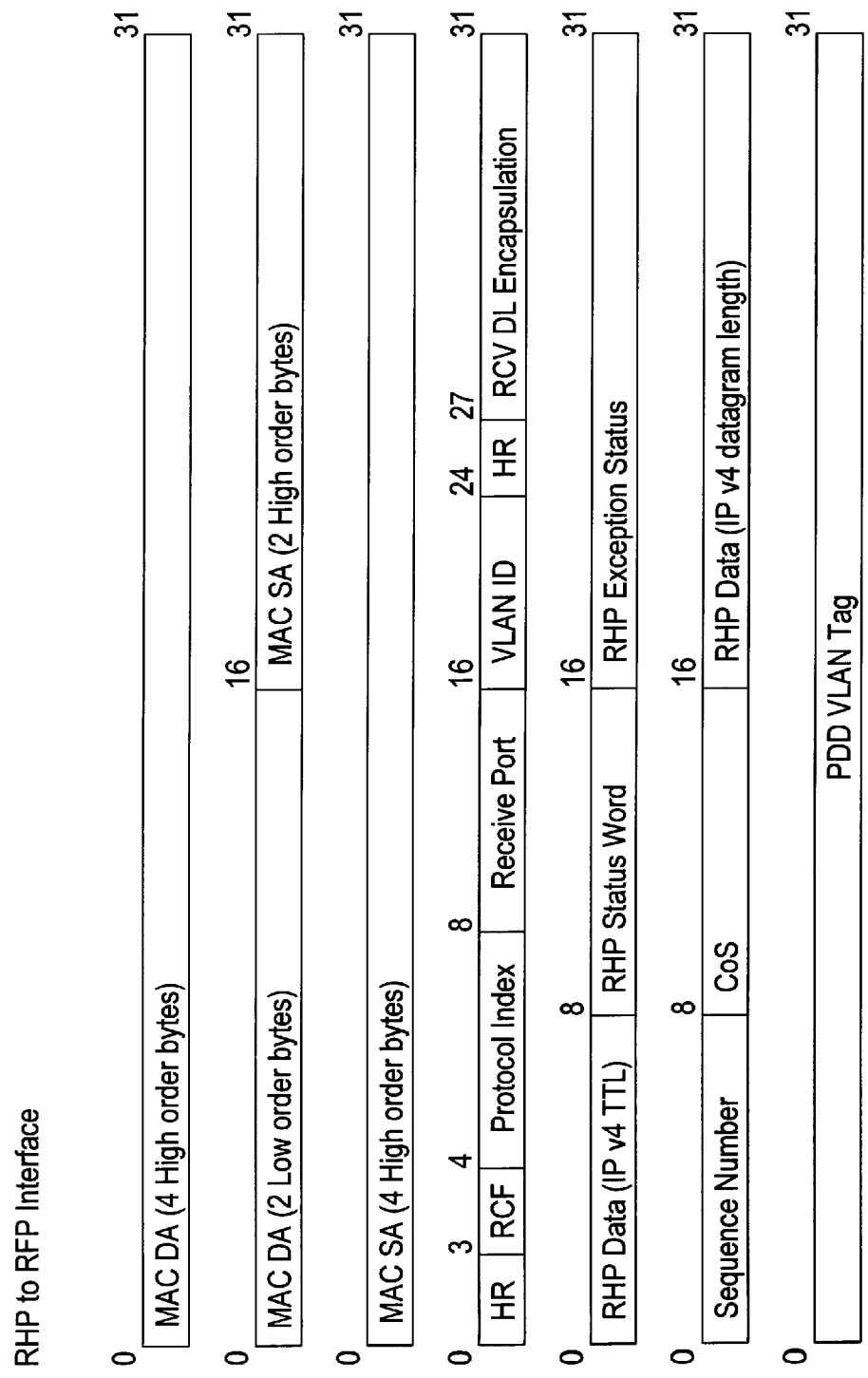
FIG. 7 illustrates a Receive Header Processor (RHP) to RFP interface.

The RHP 46 provides received frame header information to the RFP 48, such as that illustrated in FIGS. 7 and 8. In addition to that shown, the RHP 46 provides RHP status to the RFP 48 (FIG. 16) to further characterize the received data unit, and RHP exception status (FIG. 17) for reporting that an exception condition detected by the RHP 46 precludes the forwarding of the present data unit in hardware via a high speed path.

The ACA 26 to RFP 48 interface includes search address and status, protocol ID, VLAN ID, address group mask, and other information according to whether the received data unit is unicast or multicast, and bridged or routed. Exemplary ACA to RFP data is provided in FIGS. 9A and 9B for each of these data unit types. ACA cache 28 search status (FIG. 9C), entry state (FIG. 9D), and QoS state (FIG. 9E) are also reported to the RFP 48 for use in making forwarding decisions.

Figure 6:
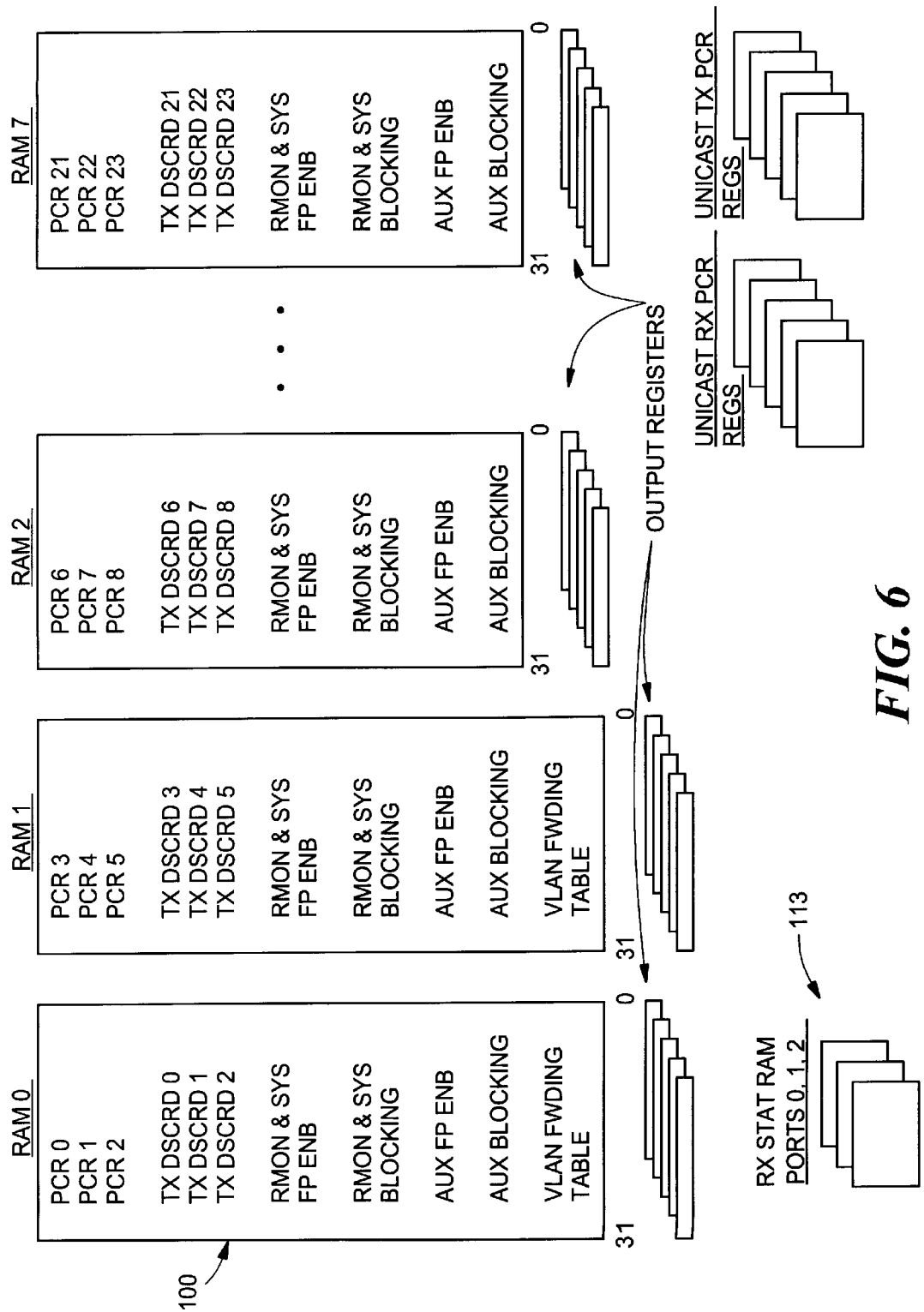
FIG. 6 illustrates data structures of the RFP, including a Configuration RAM.

The Port Control Registers (PCRs) 52 are stored in Configuration RAMs 101 associated with the RFP 48, as illustrated in FIG. 6. There are twenty-four of these PCRs for each Receive ASIC on the Network Interface Module 14, one for each port associated with the device 10. The format of the PCRs is illustrated in FIG. 18, with the data contained therein explained in FIGS. 19A through 19C. The data contained therein is utilized by the RFP 48 in making forwarding decisions.

The PCRs are one of several internal tables set up by the Frame Processor 30 and used for frame forwarding by the RFP 48. Other tables include the VLAN Forwarding Table 54, a Port Mapping Table, an RMON Probe Port Table, a Protocol Filter Table, and a QoS Configuration Table.

The Virtual Local Area Network (VLAN) Forwarding Table 54 (FIG. 15) is utilized by the RHP 46 in processing received data units belonging to a virtual LAN. A VLAN ID from the RHP 46 ("RHPVLAN") and a VLAN ID from the ACA ("ACAVLAN") are utilized by the RFP 48 in searching the VLAN forwarding table 54 under different forwarding conditions. One VLAN forwarding table 54 is provided per receive ASIC and pertains to all twenty-four ports (i.e. all ports in the present embodiment). The VLAN forwarding tables 54 on all receive ASICs must be identical. The output of the VLAN forwarding table 54 is the port state for every physical port in the device 10 and an FP deliver bit. The two-bit port state, as shown in FIG. 15, can indicate port disabled, port blocked, port learning, or port forwarding. The FP deliver bit is set by software via the Frame Processor 30 to signal that all broadcasts and non-IP multicast frames for this VLAN should be sent to the FP 30 rather than forwarded by hardware. Forwarding by the FP 30 is referred to as forwarding via the "soft path" or "slow path" because the frame is forwarded under slower, software control. Forwarding by the RFP 48 hardware is referred to as "hard path" or "fast path" because the frame is forwarded in the faster RFP 48 hardware and via the THP which handles layer 2 and layer 3 header translation utilizing high speed header translation hardware.

VLAN processing by the RFP 48 depends upon the received frame type. For Unicast Bridged Frames with a known DA, RHPVLAN is used by the RFP 48 to verify that the destination port is in the VLAN forwarding table 54 for that VLAN, when VLAN security is enabled. When disabled, no VLAN information is used since the port state is received from the PCR.

For Multicast (non-IP) or Broadcast Bridged Frames, the RHPVLAN value is used by the RFP 48 to access the VLAN forwarding table 54 to find the total flood mask of ports to be flooded for that particular VLAN.

For Unicast Routed Frames, RHPVLAN and ACAVLAN are used for detecting potential same segment redirect cases, wherein the frame is being transmitted out the same VLAN it was received on. If detected, a System Code Vector (discussed later) indicating "same segment" is generated.

For Multicast Routed Frames, two port masks result from the ACA 26 cache lookup. One is called the parent port mask and the other, the forwarding mask. The parent port mask defines all ports within the device 10 the multicast frame can be received on. If the received frame is not from one of those ports, an exception will occur. The forwarding mask contains ports to be routed to and to be bridged to. From these two masks and the RHPVLAN and ACAVLAN values, the RFP 48 extrapolates a bridge port mask and a route port mask.

For Multicast IP Bridged Frames, the same holds true as for Multicast Routed Frames except that the ACA cache entries result in a route port mask of NULL.

The Port Mapping Table defines the mapping between virtual and physical port addresses, and is implemented as a 24 deep×5 bit wide table, with the virtual port number used as an index into the table.

The RMON Probe Port Table defines the address for a Remote Monitoring (RMON) Probe, and is implemented as a 24 deep×5 bit wide table. The RMON Probe may be external or internal. Each entry in the RMON Probe Port Table corresponds to a physical port number for the RMON Probe. The entry is valid and referenced by the RFP 48 only when External Local, External Remote or Internal Roving RMON Analysis is enabled in the PCR for each receive and/or transmit port(s). RMON support is described further below.

The Protocol Filter Table defines the configuration of protocol-specific filtering. It is enabled per port, per protocol, separately for receive and transmit directions. The table is implemented as two bits (one receive and one transmit) for each of sixteen supported protocols, in a preferred embodiment. Each Receive ASIC contains one Protocol Filter Table for all twenty-four virtual ports. The Protocol Filter Table supports protocols defined in Type and LLC tables associated with the RHP 46.

The RFP 48 contains a Quality of Service (QoS) state machine (QOSSM) 110, which is responsible for policing traffic on the receive side using a Leaky Token Bucket algorithm.

The RFP maintains Traffic Counters to track packets dropped or packets which are non-conformant; the token buckets are updated accordingly. It also tracks bytes received from the Reserved traffic class.

Figure 21:
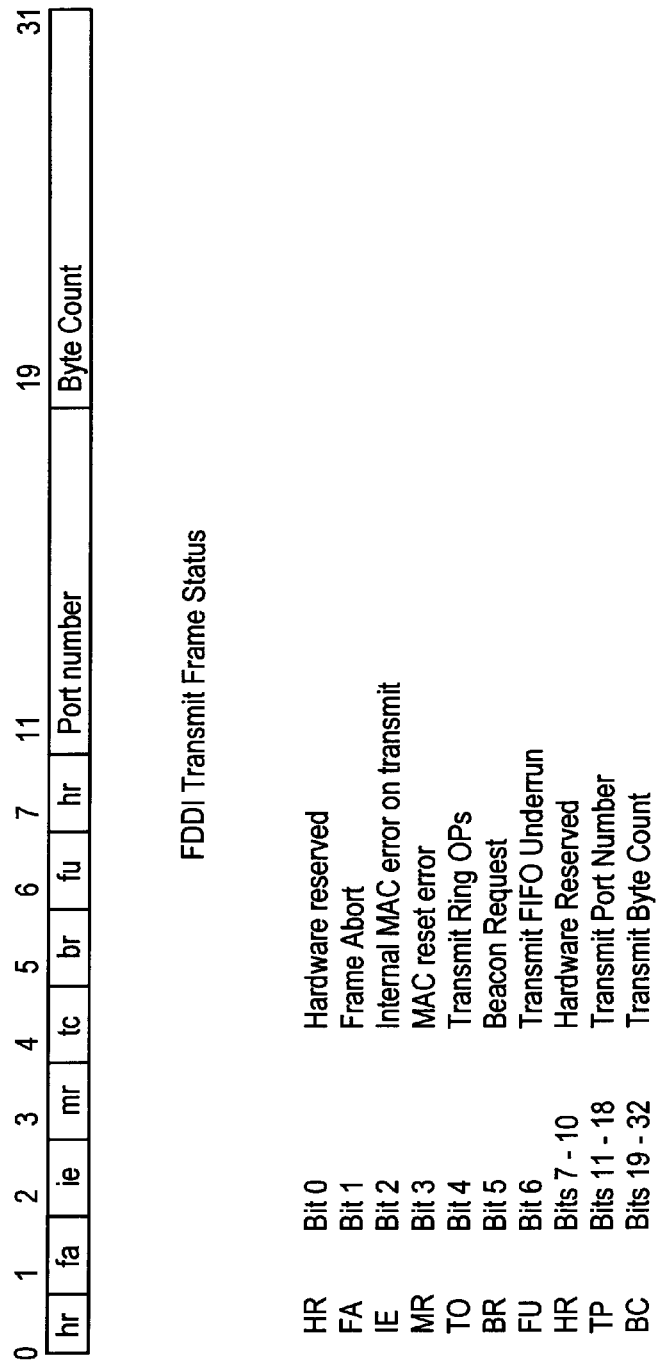
FIG. 21 illustrates an FDDI Receive Frame Status word.

The Receive State Machine (RXSM) 40 provides to the RFP 48 the status of received data units, and is primarily utilized in the generation of Receive Vectors which enable software processing of a received data unit or frame. The status received from the Receive State Machine depends upon whether the received frame is ethernet or FDDI. For an ethernet frame, the Receive State Machine 40 status to the RFP 48 (Ethernet Receive Frame Status) is illustrated in FIG. 20. For an FDDI frame, the Receive State Machine 40 status to the RFP 48 (FDDI Receive Frame Status) is illustrated in FIG. 21.

The Receive Segment Processor (RSEG) 50 provides status information generated by the RSEG DMA controller to the RFP 48.

The foregoing information is collected asynchronously in the RFP 48 by an Information Delivery System (IDS) 100 in the RFP 48. Once all of the necessary information has been received, the IDS loads it into register sets 102, enabling further processing by state machines in the RFP 48 having discrete functions.

One of these state machines is a Multicast Firewall Support System (MFSS) 104 which is used to limit the rate (in frames per second) of broadcast and multicast traffic received from the LAN and used primarily as protection against receipt of excessive broadcast frames. The PCR stored in the Configuration RAM 101 defines if multicast firewall support is enabled for the respective port. Multicast firewalls are enforced on the receive port only. Each Receive ASIC also includes three distinct Multicast Firewall Registers (one for each receive port) and a 32 bit hardware auto-reload and countdown timer. Each Multicast Firewall Register is sixteen bits wide and defines the rate in frames per time interval at which the system processes data link multicast and broadcast traffic. Data link multicast and broadcast traffic which exceeds the defined multicast rate is discarded by the RFP 48.

The FP 30 initializes the hardware timer and the Multicast Firewall Registers for each of the Receive ASICs. Each RFP 48 maintains a separate set of counters for data link multicast and broadcast frames received on the respective port. When the Multicast Firewall Bit in the receive port PCR is set, for every received multicast and broadcast frame, the RFP compares the counter for data link multicast and broadcast frames received on the port with the Multicast Firewall Register for this port. If the counter is less than the value of the Multicast Firewall Register, the RFP 48 is allowed to forward the frame. Otherwise, if the counter value exceeds the register value, the frame is discarded. Regardless of the forward or discard decision, the RFP 48 may also pass the frame to the FP 30 based upon the VLAN forwarding table configuration. When the hardware timer reaches zero, it auto-reloads itself and the RFP maintained data link multicast and broadcast frame counters are zeroed. The multicast firewall limits do not prevent multicast and broadcast frames from being forwarded to the FP 30. Rather, they only effect flooding of these frames to other interfaces.

An RMON CRC Generator (RCG) 106 is a sixteen bit CRC state machine which generates a CRC hash value from each MAC source and destination address pair or from one address and the host matrix. The output is utilized by the FP 30 in keeping track of the conversion between individual source and destination pairs.

RMON Sampling Logic (RSL) 108 is the hardware which implements one of three modes of RMON support: 1) probe in box; 2) external local; and, 3) external remote. In the first case, the probing is done internal to the device 10. In the second case, the probe is locally attached, yet monitored frames are still transmitted to a device 10 port. In the third case, monitored frames are forwarded to another, remote device which hosts the probe. Monitoring is accomplished by the RSL 108 generating monitor signals. These signals result in the construction of an RX RMON code vectors (discussed subsequently) which, when processed, result in the issuance by the RFP 48 of a Monitor Vector. The Monitor Vector enables the sampling of the received frame by the FP 30.

There are several ways in which the RSL 108 can initiate the monitoring function. A flip flop can be set by the FP 30 so that the next received frame is monitored. Alternatively, monitoring can take place, and repeat, after receipt of a predetermined number of frames.

A QoS State Machine (QOSSM) 110 performs a policing function in the RFP 48 by: determining which token bucket this flow is to be mapped to, carrying out the maintenance of the token buckets, choosing and applying the QCR controls to a given packet, and determining whether the received packet is conformant or nonconformant. Conformant frames are those which are transferred within a predetermined bandwidth for a flow. The QOSSM 110 is also responsible for implementing the Random Early Drop (RED) Controls. By controlling the token buckets, the QOSSM 110 effectively controls the bandwidth of given flows. A frame can be downgraded in priority or dropped altogether if a respective token bucket empties. A token bucket having credits below a predetermined threshold can result in a decision to discard, to lower in priority, or to enqueue but with a cell loss priority bit set.

The Register Sets 102 in the IDS 100, MFSS 104, RCG 106, RSL 108, and QOSSM 110 all provide input to a Receive Vector Generator (RVG) 114 and to a Transmit Vector Generator (TVG) 116. These state machines generate a number of vectors based upon these intermediate signals. The first group of vectors are referred to as Code Vectors (CVs). The second group of vectors are the Transmit Vector and Receive Vector, which are discussed below.

The CVs enable the operational capability of the RFP 48. For each received unicast frame, a unique set of exception-conveying CVs are generated, even if the frame is to be processed in hardware (i.e. via the hard path). Some CVs generate an exception which can result in the received frame being processed by the FP (i.e. via the soft path). For a multicast frame, twenty-four sets of CVs are generated, one for every twenty-four possible port pairs. These vectors are configurable by the FP 30. FP 30 configurability also enables the FP 30 to overwrite the RFP 48 default mode of operation.

Figure 5:
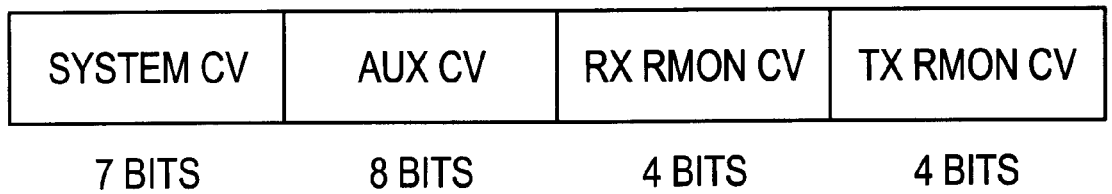
FIG. 5 illustrates Code Vectors used in the RFP in the processing of a received frame.

The CVs are comprised of a System CV, an Auxiliary (Aux) CV, an RX RMON CV, and a TX RMON CV. These Code Vectors are shown in overview in FIG. 5, and exemplary Code Vectors are shown in FIGS. 10A and 10B (System CV), FIG. 11 (Aux CV), and FIG. 12 (RMON CV). The CVs are used by the RFP 48 to forward the received frame, reject the frame, or discard the frame. The four CVs are always generated for each received frame. There can be up to 64 System CV exceptions, 256 Aux CV exceptions, and 16 RMON exceptions.

Figure 3:
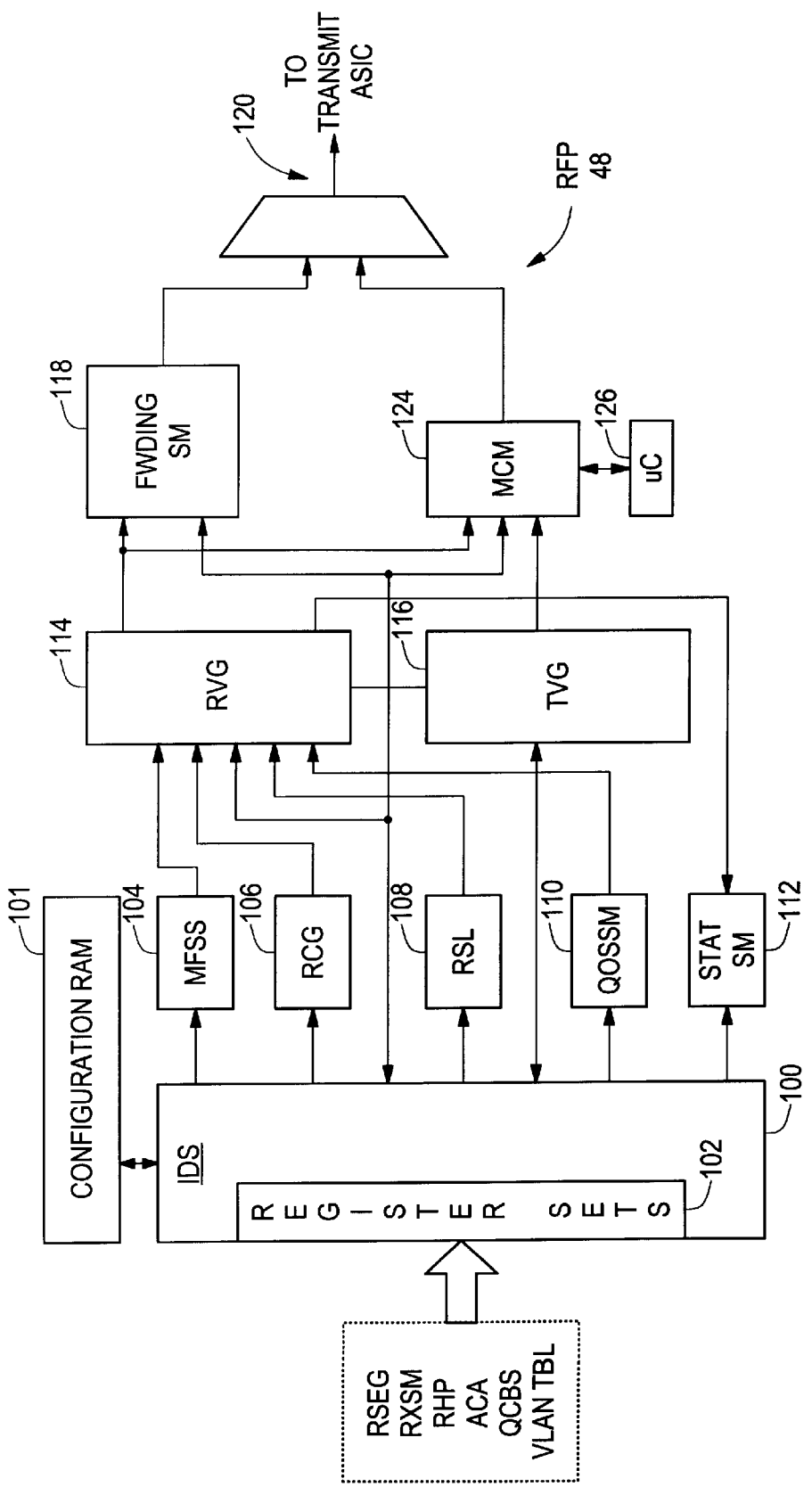
FIG. 3 is a block diagram of a Receive Frame Processor (RFP) according to the present invention.
Figure 4:
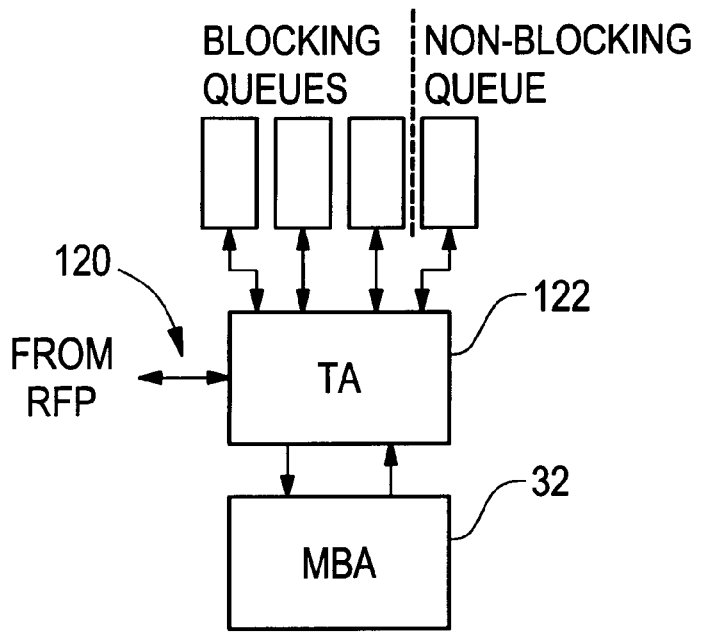
FIG. 4 illustrates frame queuing data elements associated with the RFP which enable the uninterrupted and ordered processing of received frames.

In order to provide flexibility in RFP 48 frame processing, the RFP uses programmable CV Enable Tables implemented in the Configuration RAM 101 (FIGS. 3 and 6). Each Enable Table corresponds to one of System, Aux, RX RMON and TX RMON CV groups, and represents a hardware encoded exception. These tables are also referred to as Fast Path Enable Tables (FP ENB) because they indicate whether the corresponding CV is enabled for hardware processing in the RFP 48.

The System Enable Table is 64×1 bit, the Aux Enable Table is 256×1 bit, and the RMON Enable Table is 16×1 bit. Each binary entry in a table either enables or disables RFP 48 hardware-based frame processing for each vector in the System, Aux and RMON CV groups. The RFP uses generated System, Aux and RX and TX RMON CVs as indices into the corresponding programmable CV Enable Tables. When a bit in one of these tables is set, it enables the RFP 48 to handle the particular CV in hardware. If not set, the handling of the respective CV is performed by the FP 30. The RFP 48 logically ANDs CV Enable Table bits for each of the CV groups for a received frame. If the result is non-zero (i.e. all code vector enable bits are set), the RFP 48 handles the frame entirely in hardware. If the result of the AND is zero, the frame is passed to the FP 30 for further processing. This mechanism enables flexible configuration through software of which CVs are processed by hardware versus software.

In addition to the programmable CV Enable Tables, the RFP 48 uses programmable Blocking Enable Tables (BLOCKING, in FIG. 6), also which are in the Configuration RAM 101 (FIG. 3), to determine if the generated CV must be blocking or non-blocking. Blocking indicates that if a first frame is forwarded to the FP 30 for processing, which takes longer than normal hardware processing, frames received subsequent to the first frame must not be forwarded until the FP 30 has completed processing the first frame. As will be discussed subsequently, plural queues are provided for maintaining order among later received frames while the FP completes processing and forwards the present frame. It is necessary to maintain frame order within a single session. Misordering between sessions is allowed, however.

The Blocking Enable Tables are used in the same fashion as the CV Enable Tables, i.e. the System Blocking Enable Table is 64×1 bit, the Aux Blocking Enable table is 256×1, and the RMON Blocking Enable Table is 16×1. The RFP 48 logically ORs Blocking Enable table bits for each of the CVs for a frame and if the result is non-zero, the CV group generated by the RFP 48 is blocking. If the result is zero, the RFP 48 generates a non-blocking CV group. If a received frame is a control or error frame, which will not be forwarded anyway, blocking is not enabled to maintain throughput rates.

To summarize, if any one CV generated by the RVG 114 has a corresponding Enable Table bit set to zero, the corresponding frame is handled by the FP 30. If, for a frame to be handled by the FP 30, any one of the CVs generated by the RVG 114 is indicated as blocking, receive port blocking is initiated.

For a typical unicast frame, there is one port pair, i.e. a receive port and a single transmit port (one of which may be a probe port). Upon receipt of a frame, the RFP 48 generates one complete set of CVs, including System CV, Aux CV, RX RMON CV, and TX RMON CV, as in FIG. 5. Plural CVs may be applicable to the received frame, though only the highest priority vectors are employed. With these CVs, the CV Enable Tables are checked. If any respective entry is a zero, the frame is processed by the Frame Processor 30. If all Enable Table bits are set, a Transmit Vector is generated by the RFP 48 for forwarding via the fast path. If the frame is to be forwarded to the FP 30, the same CVs are used to index Blocking Enable Tables which, if a bit is set, requires that the receive port be blocked.

A typical multicast frame is received on one port and can be forwarded out of up to twenty-three other ports. However, the RVG 114 generates twenty-four System CVs, twenty-four Aux CVs, one RX RMON CV (there is only one receive port), and twenty-four TX RMON CVs. Each CV is then checked against a respective entry in the CV Enable Tables. All of the returned bits must be set for the multicast frame to be forwarded by the RFP 48 via the fast path. If any one of the Enable Table bits is not set to one, all of the corresponding Blocking Table bits are checked, and if any one is set, the receive port is blocked to maintain frame ordering. If blocking is enabled, an Ethernet Transmit ASIC (ETA) 122 controls the queuing of blocked frames. This is discussed further below.

If multiple CVs are applicable to a particular received frame, the priority of each is compared. If the highest priority CVs are of the same priority, the CV Enable Table entries for these CVs are checked and if only one is set, then that is the CV employed in the Receive Vector. Otherwise, the first CV having a non-no-op value is employed.

The RFP 48 also generates, for every processed data unit (also referred to herein as a frame, though such reference is not intended to be limiting to the received data type), either a Receive Vector or a Transmit Vector. Collectively, these vectors define the port(s) on which the frame is to be forwarded and the inbound and outbound data link encapsulation types.

The following are possible outcomes of a frame forwarding decision made by the RFP 48.

1) The frame is discarded. This occurs when the receive frame status from the RXSM 40 indicates an error, when the receive and/or transmit port Spanning Tree state is blocked or not in forwarding mode according to the PCR 52 and VLAN Forwarding Table 54, when the MAC source and destination addresses were learned on the same port as reported in the ACA 26 status, when the MFSS 104 requires it, when forwarding the frame violates MAC address or port group assignments per the ACA 26 status, when forwarding the frame violates the VLAN configuration per the VLAN Forwarding Table 54, or when forwarding the frame violates the protocol specific filter configuration per the PCRs 52. For these cases, the RFP 48 discards the frame with no FP 30 intervention. The appropriate counters are updated, and buffers are released.

2) The frame is forwarded entirely via the fast path. This is the normal RFP 48 operational case. The frame may be bridged or routed, and the MAC DA address may be unicast, multicast, or broadcast. The RFP generates the Transmit Vector which defines the output port(s) and the inbound and outbound encapsulation for unicast routing frames. The Transmit Vector contains enough information for the THP 60 to perform appropriate Data Link and Network Layer header translations.

3) The frame is passed to the FP 30 for further processing. This includes frames addressed to the network device 10 such as SNMP (Simple Network Management Protocol), SMT (FDDI Station Management) traffic, or Spanning Tree BPDUs (Bridge Protocol Data Units). The RFP 48 forwards the frame to the FP 30 for further processing, and the RFP 48 continues to receive frames from the receive port (i.e. the receive port is not blocked). This occurs when the receive frame status indicates an error as reported in the Receive Status from the RXSM 40, when the MAC DA is marked as an internal address in the ACA 26 status, when the frame is to be routed and the network layer DA is marked as the internal address of the network device 10 as reflected in the ACA 26 status, when the frame is to be routed and the network layer DA is on the same interface from which the frame was received as reflected by the ACA 26 status, or when the RHP 46 exception status indicates an error exception. In these cases, the RFP 48 generates a Receive Vector which enables the FP 30 to process the frame.

4) The frame is passed to the FP 30 for further processing. This includes frames which cannot be forwarded via the fast path. In this case, the RFP 48 blocks the receive port to preserve frame ordering. RHP 46 and ACA 26 processing continues, however. This is the case when the ACA 26 lookup on the MAC SA and/or MAC DA and/or network layer DA fails or is incomplete per the ACA 26 status, when the RFP 48 detects that the frame must be fragmented per the PCR 52 and RHP 46, when the RFP 48 detects that the receive and/or transmit path Custom Filter validation must be done based upon the PCRs 52, when the RFP default is overridden by the FP 30, or when the RFP 48 detects a multicast exception processing bit set. For these cases, the RFP 48 generates a Receive Vector which enables the FP 30 to process the frame in software. Upon completion of processing, the FP 30 unblocks the port receive queue associated with the Transmit ASIC 122.

5) The frame is forwarded by the RFP 48 and also passed to the FP 30 for further processing. This mechanism is available for both bridged and routed frames, and for unicast, multicast, and broadcast frames. This mechanism is invoked either by a notification defined in the respective ACA cache 28 entry and RMON sampling configuration, or through Internal RMON configuration in the PCR 52 of the receive port. This occurs either when the FP 30 needs to perform selective sampling of frames forwarded by the RFP 48 hardware, or when the FP 30 is maintaining statistics in addition to those being accumulated in the Receive ASIC.

The Receive Vector is generated by the RVG 114 using the CVs and the other data made available from the Configuration RAM 101, the IDS 100, and the other RFP 48 state machines shown in FIG. 3. Receive Vectors are forwarded to the FP 30 for frames that require further processing by the Frame Processor 30.

The Transmit Vector is generated by a Transmit Vector Generator (TVG) 116, also using the CVs, IDS information, and state machine information. Transmit Vectors are used for single and multiple port frame transmission, i.e. hard path forwarding. A Transmit Vector is also generated when the frame is to be discarded. Transmit Vectors (TVs) are generated by the RFP 48 for fast path forwarding or by the FP 30 for frames forwarded under FP 30 control. The FP 30 generates a Transmit Vector when a frame is transmitted by the FP 30 and/or when the port's receive queue must be un-blocked or buffers de-allocated.

Figure 13:
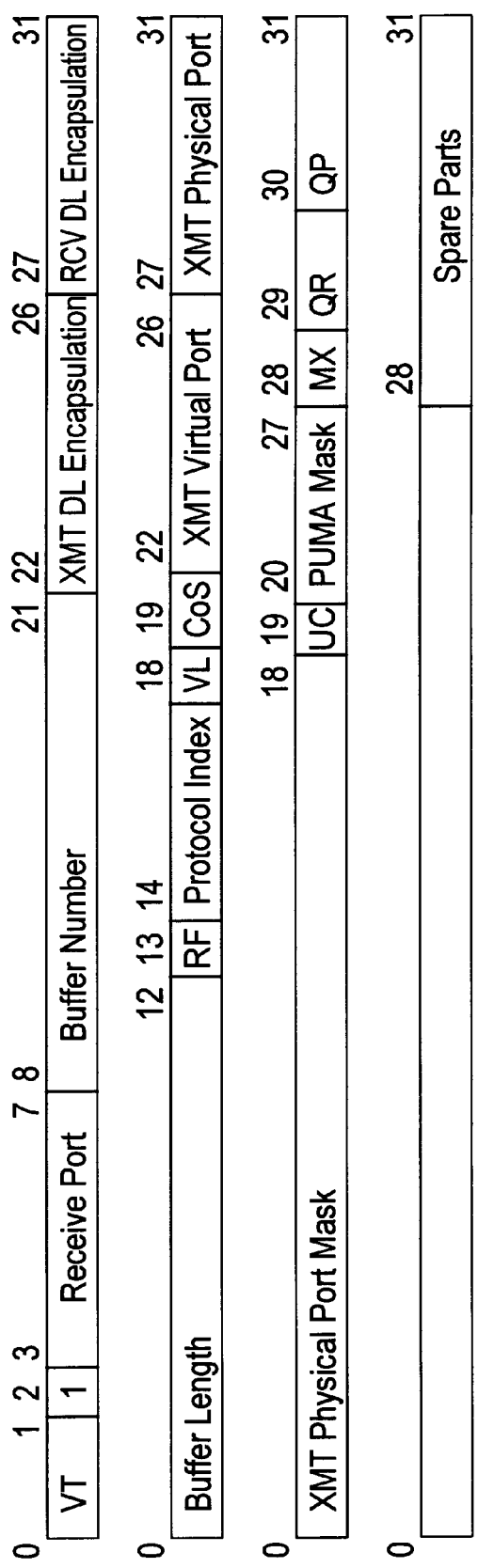
FIG. 13 illustrates the format of an RFP Transmit Vector.

The definition of an RFP 48 generated Transmit Vector is illustrated in FIG. 13, with fields having the definitions found in FIGS. 22A and 22B.

The Receive Vector (RV) is partially composed of exception type Code Vectors; the CVs in the RV contain the hardware encoded exception. Other information in the Receive Vectors, and the Transmit Vectors, define port(s) on which the frame is to be forwarded, and inbound and outbound data link encapsulation type. The FP uses the information associated with the RV to process frames not forwarded by hardware, or frames forwarded by hardware and which are also monitored by the FP 30. Each CV acts as an index into a CV exception handler table maintained by the FP 30.

The Receive Vectors are of one of the following four types:

1) Type 1 Monitoring Vector (2 long words)—This is a special purpose vector used to maintain statistics on a per IP v4 multicast routing session between two IP addresses. This vector does not have a frame buffer associated with it. In a special version of this vector, a No-op vector, the frame length and monitoring tags are set to zero. See FIG. 14A.

2) Standard Internetworking Exception, or Receive Vector (3 long words)—This vector is used for all unicast/multicast, bridge and route exception cases. This vector has a frame buffer associated with it. See FIG. 14B.

3) Type 2 Monitoring Vector (3 long words)—This vector is used for RMON processing, and has a frame buffer associated with it. See FIG. 14B.

4) Type 3 Monitoring Vector (4 long words)—This vector is used for special cases yet to be defined. See FIG. 14C.

The data fields for the Receive Vector are illustrated in FIGS. 14A–14C and are defined in FIGS. 23A and 23B.

Again with regard to the Code Vectors, the System Code Vectors fall into one of the following groups, in order of precedence (see FIGS. 10A and 10B):

1) Data Link and hardware errors—These include frame data link, RSEG and FDDI abort error. These System CVs have the highest precedence, some resulting in frame discard, and some resulting in FP 30 processing of the received frame.

2) Internal Information Exceptions—These System CVs include cases, which may or may not be forwarded by the FP 30, but in all cases must be processed by the FP 30. Receive Vectors result when this group of System Code Vector is generated. The internal exceptions which are addressed by this group include non-LLC traffic, unknown MAC SA, "other" internal address exceptions, unknown source VLAN, and multicast frame exceptions. Spanning Tree port state exceptions are also filtered by this group.

3) Hardware Filters/Discard Exceptions—For all exceptions of this group, the default action is to discard the frame.

These exceptions include, in order of priority, bridge same-segment traffic, multicast firewall exceptions, VLAN security, VLAN configuration, address cache filters, address, port, combination group filters, excess traffic filtering, protocol filters, IP v4 multicast parent exception, and IP v4 multicast transmit TTL exception.

4) Forwarding Exceptions—Forwarding exceptions always cause the generation of Receive Vectors in the RVG 114. These exceptions include, in order of priority: RHP exceptions, unicast IP v4 route disabled exceptions, cache lookup miss (including unknown MAC DA, unknown IP v4 unicast and multicast), same segment IP v4 routed traffic, LLC length exception, internal address exceptions (separate for route and flow cache), receive and transmit override, and fragmentation exceptions.

5) Custom Filters—These have the lowest precedence and cause the generation of a Receive Vector by the RVG 114. Exceptions in this group include protocol, multicast and general Custom Filters.

The Auxiliary CVs of FIG. 11 aid in handling system exceptions and provide for software optimization. For example, when handling a unicast bridge frame with an unknown MAC SA from ethernet, there is no need to test for fragmentation, etc. In addition, each of the bridge or IP v4 router auxiliary vectors may be disabled for hardware based forwarding. There are three Auxiliary Code Vector groups, as follows:

1) Bridge Forwarding Auxiliary Vectors—By default, all of these vectors are enabled for hardware forwarding. These vectors include unicast ethernet to ethernet/FDDI/ATM, multicast ethernet/FDDI/ATM and other permutations of the above.

2) IP v4 Router Forwarding Auxiliary Vectors—These hardware forwarding vectors include unicast ethernet to ethernet/FDDI/ATM, multicast ethernet to ethernet/FDDI/ATM, and other permutations of the above.

3) IPX Router Forwarding Auxiliary Vectors—These hardware forwarding vectors include unicast Ethernet to Ethernet/FDDI/ATM.

4) Other routed protocols not supported in hardware, i.e. AppleTalk (TM).

The RMON CVs of FIG. 12 are separately generated for receive and transmit paths. They allow for efficient handling of roving analysis on both receive and transmit paths for FP handled exceptions. Some of these vectors disable hardware processing. These vectors include the following:

1) External Local RMON
2) Internal Local RMON
3) External Remote RMON
4) Internal Sampling
5) Internal Local Probe
6) External Local Probe
7) External Remote Probe The foregoing CV definitions provide efficient software vector handling logic. Since these exceptions are checked after all discard cases, the FP 30 forwarding software never has to check for receive side conditions such as port states, hardware based filters, same segment traffic, errors, etc. In addition, the RFP 48 always attempts to generate a correct transmit forwarding mask, even when a Receive Vector is being generated. This enables the software to skip testing transmit side conditions such as port states, hardware based filters, same segment traffic, errors, etc.

For every processed frame, the RVG 114 and the TVG 116 generate a list of port(s) on which the received frame is to be forwarded. A Transmit Port Mask is derived after application of Spanning Tree port states, all applicable hardware based filters, and all applicable VLAN flooding domain restrictions. The port masks indicate which are the appropriate output ports for this received frame.

Statistics are maintained in the RFP 48 by a Statistics State Machine (STAT SM) 112. The statistics tables maintained are illustrated in FIGS. 24A through 24F. This state machine maintains the bulk of the Management Information Base (MIB) defined statistics in an associated Receive Statistics RAM (RX STAT RAM, as in FIG. 6). Periodically, the FP 30 reads and aggregates the counters, which are cleared in hardware after being read by the FP 30. The RFP STAT SM 112 maintains the following counters.

Protocol specific counters are maintained on a per physical port, per protocol, per receive direction basis. These counters are used to implement proprietary VLAN and RMON MIB tables. These counters include: unicast frames received; unicast bytes received; multicast frames received; multicast bytes received; broadcast frames received; and, broadcast bytes received. For each Receive ASIC there are sixteen sets of these counters since the Receive ASIC can recognize up to fifteen protocols and one default. Therefore, two counters for each of unicast, multicast and broadcast times sixteen protocols times three ports results in a total of 288 protocol specific counters. For four byte counters, the total RAM required is 1152 bytes.

Bridge specific counters are maintained per physical port, and include: unicast bridge frames received; unicast bridge bytes received; non-unicast bridge frames received; and, non-unicast bridge bytes received. Two counters for each of unicast and non-unicast times three ports results in a total of twelve bridge specific counters, or 48 bytes of RAM total.

IP v4 router specific counters are maintained per physical port. These counters include: unicast IP v4 router frames received; unicast IP v4 router bytes received; non-unicast IP v4 router frames received; and non-unicast IP v4 router bytes received. Six such counters are required for a total of 48 bytes.

IPX router specific counters are maintained per physical port, and include: unicast IPX router frames received; and, unicast IPX router bytes received. 48 bytes of RAM are required for these six counters.

Discard frame statistics are maintained for frames and octets discarded by the RFP 48. These counters are maintained per port, and include: multicast limit exceeded; multicast limit exceeded frame discard; "same segment" discard frames; receive port non-forwarding frame discards; transmit port non-forwarding frame discards (unicast frames only); receive frames discarded due to buffer congestion; transmit IP v4 routed multicast frames discarded due to configuration; bytes for all received frames discarded by the hardware including frames discarded due to MAC errors and RFP applied filters on receive path; bytes for all transmitted frames discarded by the hardware including frames discarded due to MAC errors and RFP applied filters on transmit path; receive frames discarded due to VLAN security violation (unicast bridged frames only); receive frames discarded due to QoS configuration; IP v4 received frames discarded due to parent/forward mask configuration; received frames discarded due to receive path hardware configured filters; and, transmit frames discarded due to transmit path hardware configured filters. There are 21 receive discard counters and 72 transmit discard counters, requiring 372 bytes.

RMON 1 specific statistics are collected in counters on a per port basis. They are used to count the frame size distribution on the LAN, i.e. the number of frames on the LAN which fall within certain frame size ranges. These counters include: frames between 17 and 64 bytes received; frames between 65 and 127 bytes received; frames between 128 and 255 bytes received; frames between 256 and 511 bytes received; frames between 512 and 1023 bytes received; frames between 1024 and 2047 bytes received; frames between 2048 and 4095 bytes received; frames between 4096 and 4500 bytes received; and, frames greater than 4500 bytes received. Twenty-four counters are required, using 96 bytes of RAM.

The RFP 48 performs several different types of filtering on each frame: MAC Address Group, Combination Group, Custom Filters, protocol specific, and VLAN.

MAC address groups form network management configurable communities of interest. End-stations can communicate with each other only if they share at least one address group in common. MAC address groups are localized to a single network device.

There is a maximum of thirty-two MAC address groups maintained by the ACA address cache. The RFP 48 enforces MAC address group assignments for bridged and routed frames. To accomplish this, the RFP 48 logically ANDs the MAC address groups of source and destination addresses. If the result of the AND is non-zero and the Address Group filters are enabled on receive and/or transmit, the frame can be forwarded. If it is zero, however, the frame must be discarded. Both MAC multicast and broadcast addresses are members of all address groups. MAC address group filters are installable on the receive and/or transmit path. There are two configuration parameters in the Port Control Registers, the Address Group Receive Enable bit, and the Address Group Transmit Enable bit. The RFP performs MAC address group enforcement only when the Address Group Receive Enable bit in the PCR of the receive port or the Address Group Transmit Enable bit in the PCRs of the transmit ports are set.

Port groups are used for the same purpose as MAC Address Groups, i.e. individual end-stations attached to switch ports inherit port group assignments. The port group assignments are maintained in the Port Group Table in the Receive ASIC, each table being 24×32 bits. Each entry corresponds to one physical port and contains bit encoded Port Groups assigned to a port. The maximum number of groups assigned to a port is 32. The RFP is responsible for enforcing port group assignments by logically ANDing the receive and transmit port groups. If the result of the AND is non-zero and Port Group filters are enabled on receive and/or transmit path, the frame is allowed to be forwarded. If the result is zero, the frame must be discarded. Port groups are enforced for both MAC DA unicast and multicast/broadcast bridged and routed frames. There are two configuration parameters in the Port Control Registers, the Port Group Receive Enable bit, and the Port Group Transmit Enable bit. The RFP performs port group enforcement only when the Port Group Receive Enable bit in the PCR of the receive port or the Port Group Transmit Enable bit in the PCRs of the transmit ports are set.

Combining Port and Address groups allows the implementation of protocol independent VLANs, called Combination Groups. To enforce the port groups/MAC address group assignments, the RFP logically ANDs the MAC address group of the MAC source address with the MAC address group of the MAC destination address with the port group of the transmit port. If the result is non-zero and Combination Group filters are enabled on receive and/or transmit path, the frame is allowed to be forwarded, otherwise it is discarded. Port groups are enforced for both MAC DA unicast and multicast/broadcast bridged and routed frames. There are two configuration parameters in the Port Control Registers, the Combination Group Receive Enable bit, and the Combination Group Transmit Enable bit. The RFP performs enforcement only when the Combination Group Receive Enable bit in the PCR of the receive port or the Combination Group Transmit Enable bit in the PCRs of the transmit ports are set.

Custom filters are detected by the RFP 48 and enforced by the FP 30. The RFP 48 forwards the frame to the FP 30 for further processing, while blocking the port receive queue to maintain frame ordering, in the following cases: the MAC DA address is multicast and the PCR of the receive port has a multicast receive path filter bit set; the MAC DA address is multicast and the PCR of the transmit port has a multicast transmit path filter bit set; the PCR of the receive port has a receive path filter bit set; or, the PCR of the transmit port has a transmit path filter bit set.

The RFP uses the Protocol Filter table to enforce protocol specific custom filters installed on the receive and/or transmit ports. This filtering is applied to either or both of received and transmitted frames. Protocol specific filters are applied to bridged and routed frames, both unicast and multicast. There are two actions which can result from the successful application of a protocol filter: 1) discard the frame; or 2) pass the frame to the FP 30 for further processing.

Port state information is retrieved by the RFP 38 either from the respective PCR when handling unicast bridged frames, when the system is in the single bridge mode, or when the VLAN security is disabled. Otherwise, the port states are defined by bits set in the VLAN forwarding table.

Specific frame types result in specialized RFP processing. The RFP 48 handles non-IP v4 MAC DA multicast frames by analyzing ACA status and the VLAN Forwarding Table to determine the bridge flooding domain and optionally when the frame must be passed to the FP 30 for further processing. If the frame is to be forwarded by hardware, the RFP uses the VLAN Forwarding Table to determine the flooding domain and Spanning Tree port states.

For IP v4 multicast frames, the ACA returns one or two port transmit bit masks.

For bridging frames with unicast MAC destination addresses, the RFP 48 uses the VLAN Forwarding Table 54 to verify that the frame may be forwarded out the destination port as determined by the ACA lookup.

For broadcast frames, the ACA 26 does not install the broadcast address in the ACA bridge cache. Therefore, the RFP uses only the VLAN Forwarding Table entry to define the bridge flooding domain.

IP fragmentation is performed by the FP 30. However, the RFP 48 must identify frames which exceed the size of the largest frame allowed to be forwarded onto the port. This is done in the RFP 48 by comparing the size of the received frame with a Fragment Threshold Register of the transmit port and if the frame size is greater than that allowed, forwarding the frame to the FP 30 for fragmentation. In addition to the Fragment Threshold Register, the RFP 48 maintains a Maximum Transmission Unit (MTU) Register, one per Receive ASIC, for all receive ports. Frames of size greater than the maximum frame size as reflected in the MTU Register for a given network media type are truncated and discarded.

In the RFP 48, IP v4 Multicast traffic is handled in a distinct fashion. The RFP 48 verifies that the receive interface is in the Parent Port Bit Mask returned from the ACA 26, and discards the frame if this is not true. The RFP 48 passes the frame to the FP 30 when: 1) the RHP 46 Exception Bit is set; 2) the ACA cache 28 lookup failed; and 3) the ACA cache 28 entry is marked as internal. For the RFP 48 to forward the frame, it calculates, according to the following formulas, a set of ports on which the IP v4 multicast frame is to be bridged and a set of ports on which the frame is to be routed.

> Bridge Port Bit Mask=(Parent Port Bit Mask)&(Forward Port Bit Mask)
>
> Route Port Bit Mask=(Parent Port Bit Mask)&(Forward Port Bit Mask)

The RFP 48 generates a Transmit Vector for bridging using a list of interfaces defined in the Bridge Port Bit Mask, and a Transmit Vector for routing using a Route Port Bit Mask and a per receive port Time To Live (TTL) table. A bit from the ACA cache dictates whether the RFP 48 generates a code vector to the FP 30 after generating two Transmit Vectors. This code vector is used by the FP 30 to maintain IP v4 multicast traffic specific statistics.

The Configuration RAM 101 is implemented in a first embodiment as eight thirty-two bit wide RAMS. The RAMs are utilized as shown in FIG. 6. Note that a VLAN Forwarding Table, which requires a 256×49 bit space, are disposed in the first two of the eight RAMs. Also disposed in the eight RAMs are the PCRs for each of twenty-four ports, the transmit discard counters (TX DSCRD) used to track transmit frames discarded due to transmit path hardware configured filters, the RMON and System CV Fast Path Enable Tables (RMON & SYS FP ENB), the RMON and System CV Blocking Enable Tables (RMON & SYS BLOCKING), the Aux CV Fast Path Enable Tables (AUX FP ENB), and the Aux CV Blocking Enable Tables (AUX BLOCKING). Sets of five, thirty-two bit registers are associated with each RAM for the purpose of reading out data from the RAM. For instance, the PCRs for both the receive and transmit ports must be read out of the RAM and into separate registers associated with the RAMs. In the particular case of a unicast frame, the respective RX and TX PCR values are read out of the RAMs and stored temporarily in separate unicast RX and TX PCR registers.

The output of the RVG 114 and the TVG 116 can follow two configurable paths. According to a first path, both the Transmit and Receive Vectors are forwarded by a Forwarding State Machine (FWDING SM) 118, which directs the vector values across an I/O bus 120 to a Transmit ASIC (TA) 122 such as an Ethernet Transmit ASIC. The TA 122 enables access to the Receive and Transmit Vectors by the Master Buffer ASIC 32, which acts as the interface to the Frame Processor 30 for Receive Vectors and the Transmit Segment Unit (TSEG) FIFOs 59 for Transmit Vectors. The latter path is part of the fast processing path referred to as the hard path. The TA 122 has associated therewith three blocking queues utilized for enqueuing frames received on a blocked port for the purpose of maintaining frame ordering. The TA 122 also maintains one non-blocking queue for use in forwarding frames on the hard or fast path when blocking is not enabled.

The second path which the Transmit and Receive Vectors can follow out of the RVG 114 and TVG 116 is through a Microcontroller Mux (MCM) 124 under the control of an associated Microcontroller (uC) 126. The MCM is also interfaced to the information received from the IDS 100. The combination of the MCM 124 and uC 126 enables the modification of primary input information under software control, potentially altering the Code Vectors generated in the RVG 114 and TVG 116 and the resulting Transmit and Receive Vectors.

Hardware support for Remote Monitoring (RMON) in the RFP 48 includes the collection of RMON statistics in hardware, enabling External Local and Remote roving RMON analysis, Internal Local roving RMON analysis, and RMON sampling. External roving analysis allows the RFP 48 to forward copies of frames received from or transmitted to RMON monitor ports to an RMON probe port. The RMON probe port can be either local (in the same network device as the RMON monitor port—local roving RMON analysis) or remote (in a different network device—remote roving RMON analysis). Internal RMON roving analysis allows the network manager to reserve a port for receiving and transmitting monitor frames. The receive and transmit traffic for the monitored port must still be processed by the FP 30, though the reserved port speeds up frame processing since it modifies data link and network layer headers of frames to be transmitted to the monitor port.

The RMON sampling is used to selectively perform RMON statistics gathering on all receive ports. Continuous statistics gathering in not possible due to the aggregate frame processing rate of up to 4,000,000 frames per second. The frame sampling rate on each port is individually configurable, with sampling occurring every n-th frame. Though the monitored frame is forwarded to the FP 30 via a monitor-type Receive Vector, the frame is still processed by the RFP 48 hardware (hard path processing). However, if some other exception is indicated by the CVs, frame processing must be accomplished by the FP 30.

In addition to the counters described above, the RFP 48 collects frame size distribution, error count, and protocol distribution, as required for Ethernet, FDDI and Protocol Directory group MIBs.

External Local Roving RMON analysis is implemented entirely in hardware. The External Local Roving RMON bit in the PCR defines if RMON monitoring on each port is enabled. The RMON Probe Port address in the RMON Probe Table defines an address of the local RMON probe port. Frames received from and transmitted to the RMON monitor port are forwarded to the RMON probe port automatically by the RFP 48. This allows the definition of more than one RMON monitor and probe port pairs in the system. It is also possible to assign two or more RMON monitor ports to the same RMON probe port.

External Remote Roving RMON analysis is implemented in both hardware and software. The External Remote Roving RMON bit in the PCR must be set and the RMON Probe Port address in the RMON Probe Table must define an address of a backbone port. This enables the RFP of the monitor port to pass all frames received from and transmitted to the port to the backbone port. For all frames received from and transmitted to the monitor port, the RFP generates CVs indicating remote roving RMON; the frame is then passed to the FP 30. Meanwhile the RFP 48 forwards the frame to the destination port(s) via the hard path. The FP must build the data link encapsulation header, perform all required data link and network layer header changes, and enqueues the frame for transmission to the backbone port. On the probe side, the RFP 48 handles frame decoding and determines the transmit probe port based upon ACA 26 input.

Internal Roving RMON analysis is performed by the RMON agent in the FP 30. It can be performed for only one port at a time. The FP 30 must reserve one port as the RMON probe port, which must be the same type as the monitor port. Only one monitor port may be defined for the Internal RMON probe port.

RMON sampling enables the FP 30 to specify the rate at which the RFP 48 passes the already forwarded frames to the FP 30 for RMON processing. The RMON sampling rate register defines the rate at which frames received from or transmitted to the port are passed to the FP 30 for RMON processing. There are three sixteen-bit RMON sampling registers in each Receive ASIC. Programming the number "x" in this register results in a monitored frame every "x" frames. The programming of the sampling rate for each port must take into account the number of ports, the total frame rate, the type of monitor processing to be performed on each of the ports, the monitor processing speed of the FP 30, and the availability of free memory buffers. The RFP 48, and the RVG 114 in particular, provides unique CVs for RMON sampling frames, allowing the FP 30 to efficiently process frames with this CV.

These and other examples of the invention illustrated above are intended by way of example and the actual scope of the invention is to be limited solely by the scope and spirit of the following claims.

What is claimed is:

1. A network bridge/router, having plural input and output ports, for analyzing a received data unit and for generating plural code vectors used in the selective processing of said received data unit, said bridge/router comprising:

a data unit processor comprising
      input data registers for receiving source and destination address information, protocol identification, and reception error data relevant to said received data unit,
      port configuration registers for providing control data with respect to each of said plural ports,
      plural data analysis state machines in communication with said input data registers and said port configuration registers for generating intermediate representations of said received data unit,
      plural vector generator state machines for generating code vectors used in addressing microcode data unit processing routines, and
      a memory for storing an enable table associated with each of said code vectors and providing an indication of whether the received data unit is to be forwarded through said bridge/router via bridge/router hardware or via software executed by a bridge/router processing unit,
   wherein said vector generator state machines execute said microcode data unit processing routines to generate at least one of plural dispatch vectors defining the further processing of said received data unit.

2. The bridge/router of claim 1, wherein said plural dispatch vectors comprise a transmit vector containing data necessary for forwarding the received data unit through said bridge/router hardware, a receive vector or a monitor vector for forwarding the received data unit to said bridge/router processing unit for further processing purposes, and a transmit vector and a monitor vector for forwarding the received data unit through said bridge/router hardware and to said bridge/router processing unit for data unit monitoring purposes.

3. A network element for processing a received data unit, said network element comprising:

a first storage element for retaining said received data unit;
   a second storage element for retaining received data unit characterizing information, said received data unit characterizing information selected from the group consisting of source and destination address information, protocol identification, and reception error data relevant to said received data unit;
   plural preprocessing elements in communication with said second storage element, each providing logic responsive to at least a portion of said received data unit characterizing information and for providing an intermediate representation thereof;
   a data unit forwarding engine in communication with said plural preprocessing elements for receiving said intermediate representations of said received data unit characterizing information and for generating an exception status code vector in response thereto; and
   a third storage element for retaining hardware processing enable tables associated with said data unit forwarding engine and indexable by said exception status code vectors, said hardware processing enable tables providing an indication of whether a respective received data unit is to be forwarded in hardware by said network element and/or by software executed by a processor unit associated with said network element.

4. The network element of claim 3, wherein said data unit forwarding engine is further for constructing one or more dispatch vectors based upon said generated exception status code vector, said hardware processing enable tables, and intermediate representation of said received data unit characterizing information, said one or more dispatch vectors for use in selectively processing said received data unit in hardware and/or in software by said network element.

5. The network element of claim 4, wherein a hardware processing enable table data value indexed by one of said exception status code vectors is utilized by said data unit forwarding engine in determining which of said dispatch vectors is to be constructed by said data unit forwarding engine.

6. The network element of claim 5, wherein said hardware processing enable tables are programmable.

7. The network element of claim 4, further comprising a programmable data unit processor in communication with said data unit forwarding engine for receiving at least one of said dispatch vectors from said data unit forwarding engine and for selectively processing said received data unit in response to one of plural software processing routines.

8. The network element of claim 7, said data unit forwarding engine further comprising a first vector generator for selectively generating at least one first dispatch vector for use in processing said received data unit by said programmable data unit processor.

9. The network element of claim 8, wherein one of said first dispatch vectors is a software processing vector for use in processing said received data unit by said programmable data unit processor.

10. The network element of claim 8, wherein one of said first dispatch vectors is a monitor processing vector for use in monitoring said received data unit by said programmable data unit processor.

11. The network element of claim 4, said data unit forwarding engine further comprising a second vector generator for selectively generating a second dispatch vector for use in processing said received data unit in network element hardware.

12. The network element of claim 4, wherein said dispatch vectors each define an output port said received data unit is to be transmitted from, and inbound and outbound data link encapsulation types for said received data unit.

13. The network element of claim 4, further comprising a transmit element in communication with said data unit forwarding engine, wherein said constructing by said data unit forwarding engine results in a function selected from the group consisting of forwarding said received data unit and discarding said received data unit.

14. The network element of claim 3, further comprising a fourth storage element, said fourth storage element comprising a blocking enable table associated with said data unit forwarding engine and indexable by said exception status code vectors, wherein a blocking enable table data value indexed by one of said exception status code vectors is utilized by said data unit forwarding engine in determining if other, later received data units are to be forwarded by said data unit forwarding engine before processing of said received data unit is complete.

15. The network element of claim 12, wherein said blocking enable table is programmable.

16. The network element of claim 3, further comprising a received data unit header processor in communication with said second storage element for providing said storage element with a portion of said received data unit characterizing information.

17. The network element of claim 16, wherein said portion of said received data unit characterizing information includes information relating to inbound data link encapsulation, source and destination address, protocol identification, datagram length, and status.

18. The network element of claim 3, further comprising a buffer unit in association with said first storage element, said buffer unit for buffering said received data unit in said first storage element, for performing address translation for said received data unit, and for providing said second storage element with address, status and priority data relating to said received data unit as a portion of said received data unit characterizing information.

19. The network element of claim 3, further comprising plural ports for receiving said received data unit, each port having associated therewith a port information register stored in conjunction with said second storage element for indicating to said plural preprocessing elements information relating to at least one of address group filters, port group filters, protocol specific filters, port type, spanning tree state and monitor state.

20. The network element of claim 3, wherein said plural preprocessing elements comprise a priority tracking state machine comprising plural token buckets, each for received data units of a respective quality of service.

21. The network element of claim 3, wherein said second storage element further comprises register sets for accumulating said received data unit characterizing information and for making such information available to said plural preprocessing elements.

* * * * *

UNITED STATES PATENT AND TRADEMARK OFFICE
CERTIFICATE OF CORRECTION

PATENT NO. : 6,185,214 B1  
DATED : February 6, 2001  
INVENTOR(S) : Leonard Schwartz et al.

It is certified that error appears in the above-identified patent and that said Letters Patent is hereby corrected as shown below:

<u>Column 21,</u>  
Line 11, "of claim 12" should read -- of claim 14 --.

Signed and Sealed this

Fourteenth Day of May, 2002

*Attest:*

JAMES E. ROGAN  
*Attesting Officer*     *Director of the United States Patent and Trademark Office*